United States Patent [19]
Coulter et al.

[11] 4,006,461
[45] Feb. 1, 1977

[54] SYSTEM FOR TRANSMITTING OPERATING CONDITION DATA FROM A PASSIVE STATION TO A CENTRAL STATION

[75] Inventors: J. Roland Coulter, Harrison; Arthur E. Fuerherm, White Plains, both of N.Y.

[73] Assignee: Tull Aviation Corporation, Armonk, N.Y.

[22] Filed: Feb. 3, 1975

[21] Appl. No.: 546,461

[52] U.S. Cl. .......................... 340/163; 340/147 R; 340/151

[51] Int. Cl.² ........................................ H04Q 9/00

[58] Field of Search ............... 340/163, 147 R, 408, 340/409, 413, 151; 179/2 A

[56] References Cited
UNITED STATES PATENTS

| | | | |
|---|---|---|---|
| 3,452,329 | 6/1969 | Pepin | 340/163 |
| 3,493,930 | 2/1970 | Stoffels | 340/163 |
| 3,529,293 | 9/1970 | Sullivan | 340/163 |

Primary Examiner—Harold I. Pitts
Attorney, Agent, or Firm—Curtis Ailes

[57] ABSTRACT

The system includes a passive station dedicated to the control and acquisition of data of an electronic apparatus and arranged for communication with a central station over a non-dedicated voice band-width communication link with connections being established from the central station. The passive station includes means to initiate a call-out operation under alarm conditions, but the communication is limited to the establishment of the connection and the transmission of a ready signal to the central station inviting the central station to issue a command to the passive station to transmit information.

13 Claims, 10 Drawing Figures

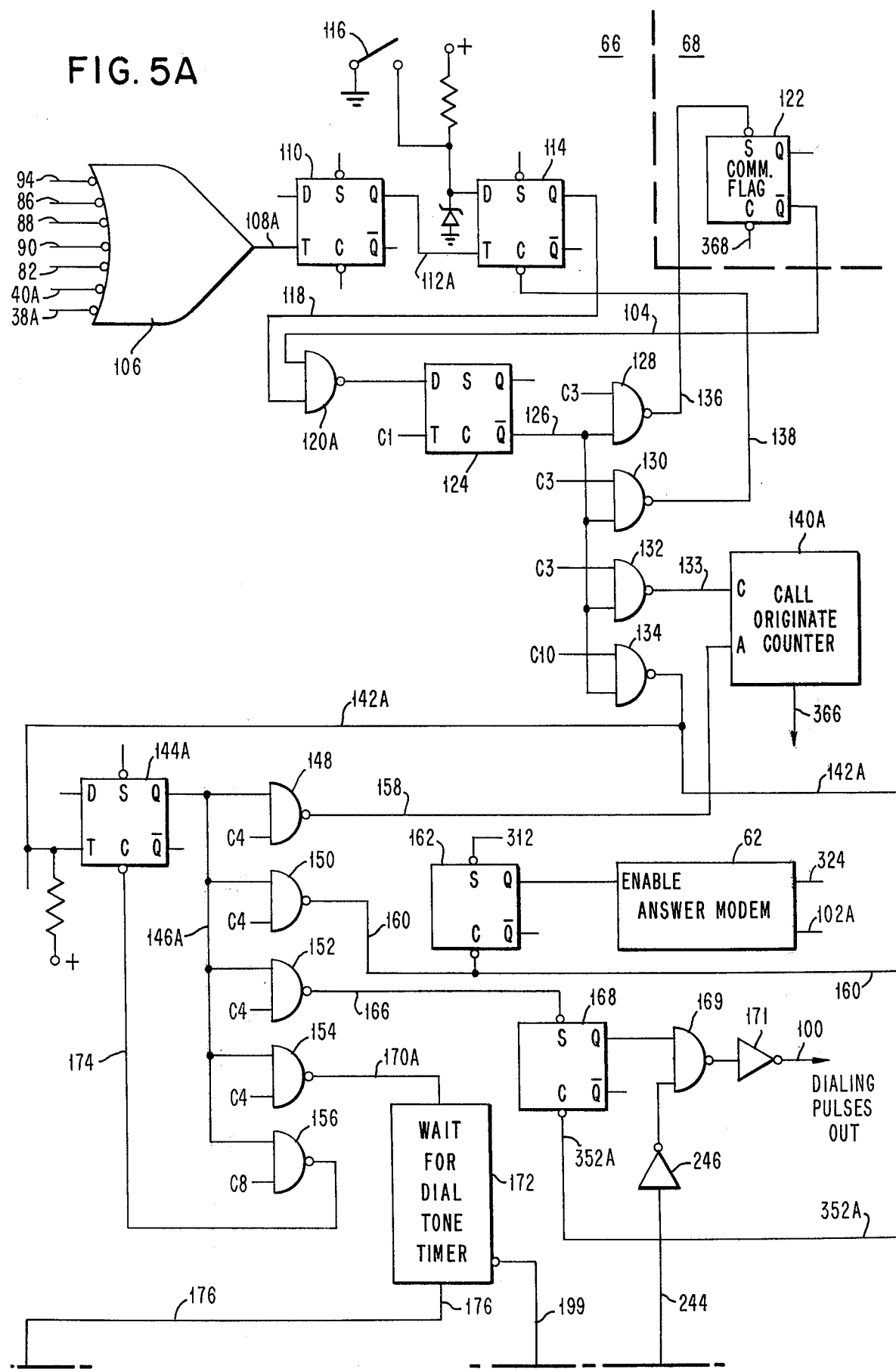

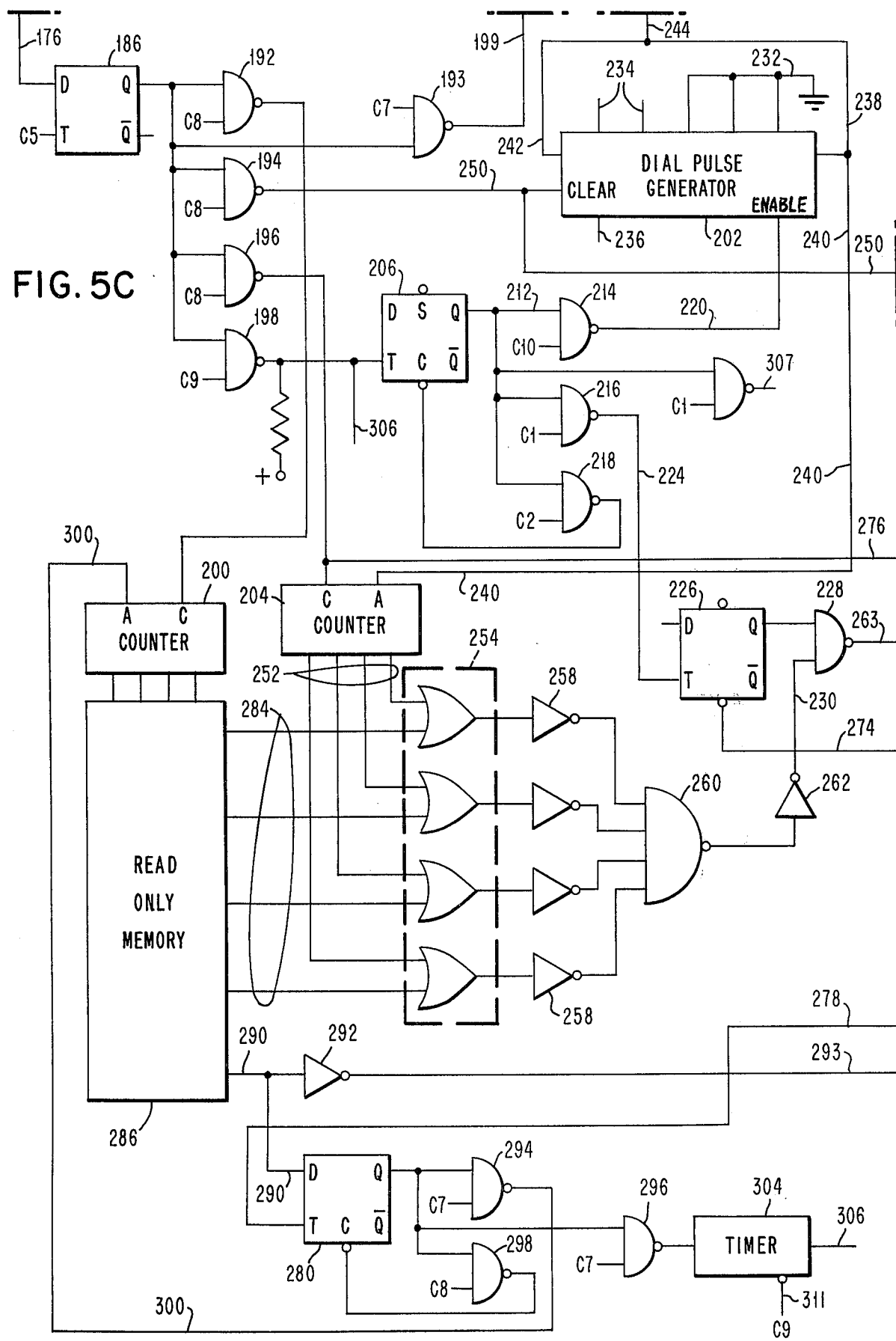

SYSTEM FOR TRANSMITTING OPERATING CONDITION DATA FROM A PASSIVE STATION TO A CENTRAL STATION

BACKGROUND OF THE INVENTION

This invention particularly relates to systems which are effective in detecting and communicating data about operating conditions of electronic apparatus such as aircraft navigational aid transmitters.

This invention is an improvement upon a REMOTE OPERATING CONDITION DATA ACQUISITION SYSTEM invented by Donald J. Toman which forms the subject matter of U.S. Pat. No. 3,820,074 issued June 25, 1974, and assigned to the same assignee as the present application.

One of the basic purposes of such a system is to obtain operating information and data relating to an electronic apparatus such as a navigation aid transmitter on a periodic basis. The data is preferably stored at a local station near the transmitter and then later sent to a central station for processing in response to a request signal from the central station. Ideally, the local station includes a capability of calling in to the central station whenever there are emergency "alarm" conditions of the electronic apparatus.

It is one important object of the present invention to provide an improved operating condition data communication system which is characterized by extreme simplicity and reliability at a minimum cost. The system is particularly characterized by a minimum equipment cost at the local station, preserving as many functions as possible for the central station which can serve many local stations.

As mentioned above, a data commmunication system of the above description preferably provides the capability of answering commands from the central station to transmit information, and also includes the capability of locally initiating calls to the central station under alarm conditions. This necessarily requires at least two different modes of operation and implies two completely different and independent sets of signal processing equipment, one for receiving incoming calls and commands, and one for transmitting calls and communications.

It is another important object of the present invention to provide important economies, especially in the local station, by combining as much as possible the signal processing apparatus used for communications initiated from the central station and communication initiated at the local station.

The local station in an operating condition data communication system of the above description necessarily requires logic circuitry which is capable of dealing with operating commands by carrying out logical programs, including safeguards to assure the completion of such commands, and a capability for resetting the logic circuits whenever the commands cannot be carried out, or are not completed.

It is another important object of the present invention to provide a local station in which the simplest possible provisions are made for assuring that if commands are not carried out, the signal processing circuits are reset so that additional attempts can be made to carry out the commands.

Aircraft navigational aid transmitters are often installed in groups. For instance, if the apparatus is for an instrument landing system, there may typically be a localizer transmitter for the purpose of transmitting azimuth guidance signals, a glide slope transmitter for the purpose of transmitting glide slope guidance signals, and at least one marker beacon transmitter, characterized as a "middle" marker, for the purpose of transmitting a very narrow vertical radio beam to signal the guided aircraft at the point in the landing approach where the pilot usually should decide whether to abort or complete the landing. These transmitters are preferably physically separated. Preferably, data should be accumulated with respect to each of these transmitters, and alarm conditions in any one of the transmitters should result in a call-out to the central station.

Accordingly, it is another object of the present invention to provide an improved operating condition data communication system for serving a related group of transmitters and which includes one or more satellite local stations which are capable of communicating with a central station through equipment which may be used in common with a main local station.

Other objects and advantages of the invention will be apparent from the following description and the accompanying drawings.

SUMMARY OF THE INVENTION

In carrying out the invention, in a preferred form thereof, there may be provided an operating condition data communcation system comprising a central station, a passive station dedicated to the control and acquisition of data of an electronic apparatus, said central station including means for establishing a connection to said passive station over a non-dedicated voice band-width communication link for transmitting commands to said passive station and for receiving responses from said passive station over said connection, said passive station including processing means operable whenever a connection is established with said central station to issue a ready signal to the central station inviting the central station to issue a command to said passive station, said processing means being operable for receiving and executing said commands from said central station and for transmitting responses to said commands to said central station, said passive station including a first alarm condition call-out means operable in response to the detection of an alarm condition at said passive station to initiate a call-out operation for establishing communication over a non-dedicated voice band-width communication link to said central station, the capability of said passive station to establish communication with said central station being limited to the establishment of the connection and the transmission of a ready signal to the central station inviting the central station to issue a command to the passive station.

DESCRIPTION OF THE PREFERRED EMBODIMENT

Figure 1:
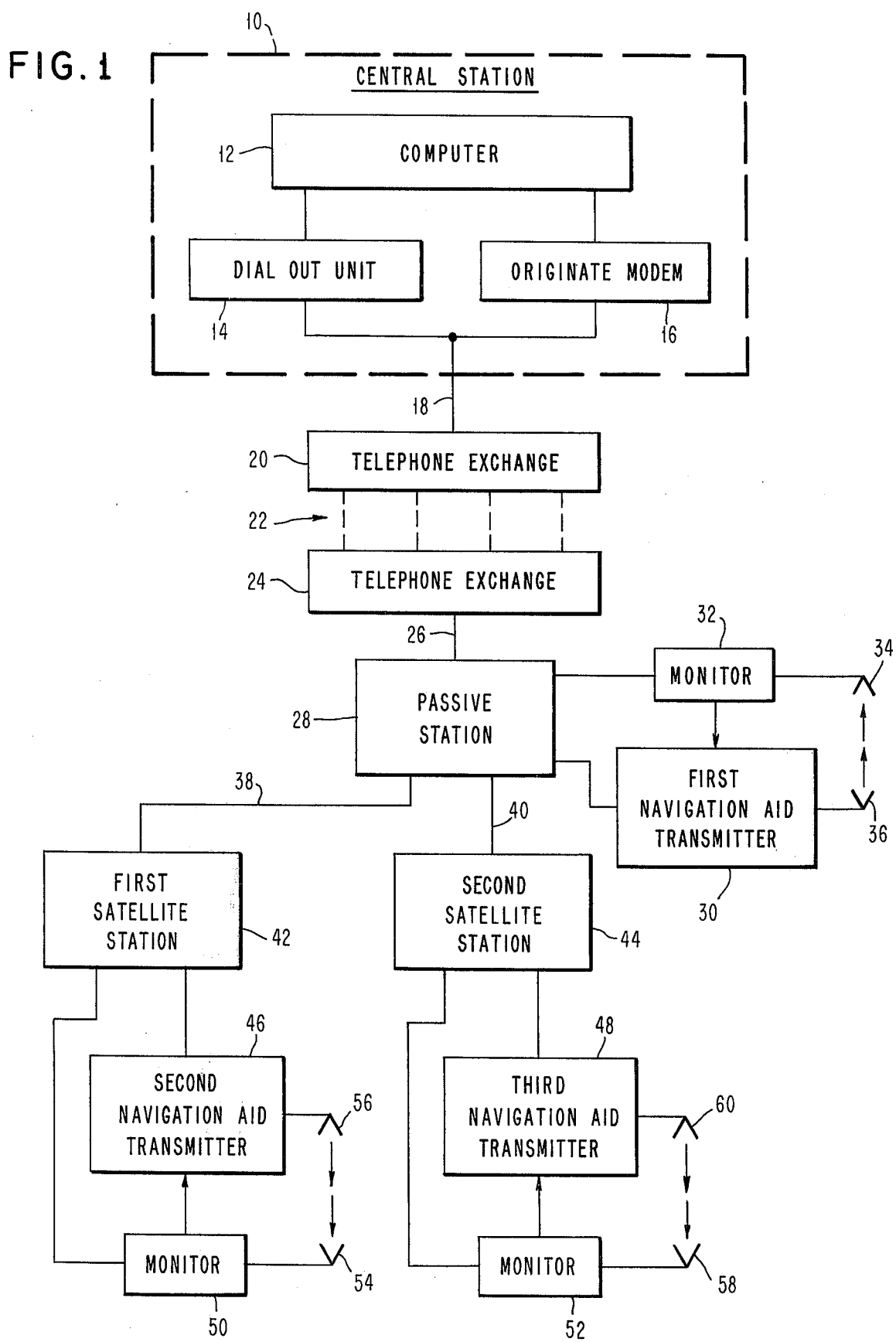
FIG. 1 is a simplified schematic circuit diagram illustrating an operating condition data communcation system in accordance with the present invention.

Referring more particularly to FIG. 1, there is illustrated a central station 10 which may preferably include a computer 12 which is arranged to communicate by means of a dial-out unit 14 and an originate modem 16 over a conventional telephone line 18 with a telephone exchange 20. The telephone line 18 may be an ordinary voice band-width telephone service line, and the telephone exchange 20 may be a regular commercial service automatic telephone exchange. By means of the dial-out unit 14, the central station may selectively establish communication through any one of a number of different alternate signal paths indicated at 22, with another telephone exchange 24, and through a selected telephone line 26 served by exchange 24, to a local station 28. Station 28 is referred to as a passive station for reasons explained more fully below. The passive station 28 is connected to collect data with respect to a first navigation aid transmitter 30, and an associated monitor 32. The monitor 32 is arranged with an antenna schematically illustrated at 34 to monitor signals from the first navigation aid transmitter issued from an antenna schematically illustrated at 36.

The passive station 28 includes dedicated line connections indicated at 38 and 40 to first and second satellite stations 42 and 44. The satellite stations 42 and 44 are respectively located near and connected to serve second and third navigation aid transmitters 46 and 48 and monitors 50 and 52 respectively associated therewith. Monitor 50 includes an antenna means schematically illustrated at 54 for receiving and monitoring radio signals emitted from the second navigation aid transmitter 46 through an antenna means schematically indicated at 56. Similarly, navigation aid signals from the third navigation aid transmitter 48 through an antenna means schematically illustrated at 60 are picked up by antenna means schematically illustrated at 58 associated with the monitor 52.

The navigation aid transmitters 30, 46, and 48, and the monitors 32, 50, and 52, are illustrated in a very simplified schematic form. Navigation aid transmitters of a type with which the present invention is particularly useful are illustrated and described in more detail in U.S. Pat. No. 3,806,935 issued Apr. 23, 1974 to Donald J. Toman for a "RADIO NAVIGATIONAL AID WITH SEPARATE STANDARD FREQUENCY SIGNAL", and assigned to the same assignee as the present application. Monitors of a type with which the present invention is particularly useful are illustrated and described in more detail in U.S. Pat. No. 3,818,476 issued June 18, 1974 to J. Roland Coulter, Warren Hundley, and Sol N. Koblick, for a "NAVIGATION AID TRANSMITTER-MONITOR SYSTEM" and assigned to the same assignee as the present application. The above described monitors are particularly useful with navigation aid transmitters of the type disclosed in the above-mentioned U.S. Pat. No. 3,806,935.

The first, second, and third navigation aid transmitters 30, 46, and 48 typically provide different navigation aid signals serving a single airport. These different signals may be closely inter-related. Thus, they may comprise the various signals necessary for an instrument landing system, the first navigation aid transmitter 30 providing the localizer signal, the second navigation aid transmitter 46 providing the glide slope signal, and the third navigation aid transmitter 48 providing the middle marker beacon signal.

The central station 10, as illustrated in the drawing, preferably includes a computer 12, which may be a programmable general purpose computer. However, a small specialized computer may also be used for this purpose, and if necessary, the computer may be dispensed with and communication may be carried out manually by a simple keying control of the dial-out unit 14 and the originate modem 16. Typically, it is contemplated that a single central station 10 will serve a large number of local stations at different airfields. The central station 10, since it is connected through conventional telephone system equipment, can be located at virtually any place which is served by direct dialing long distance telephone service. When a local station is to be called, the computer provides the dial-out unit 14 with the number of the selected station which is then direct dialed by the dial-out unit through the telephone exchanges 20 and 24, and the telephone exchange interconnections 22.

If a local station is served by the same local telephone exchange 20 which serves the central station 10, then there is no need for the long distance facilities with respect to that particular local station. However, the more typical situation is illustrated in the drawing where a connection will be established from the local telephone exchange 20 serving the central station 10 through one of the long distance interconnections 22 to the local telephone exchange 24 serving the selected local station. It will be understood that the interconnections 22 between the local telephone exchanges will typically include a number of repeater stations and long distance telephone links. While only one interconnection is used at a time, a plurality of potential interconnections are illustrated because it is well known that the direct dialing long distance telephone systems typically provide various alternate circuit routings between any two local exchanges depending upon message loads and circuits availabilities.

The originate modem 16 of the central station is a modulator-demodulator apparatus which is capable of sending digital information by switching back and forth between two tones which are in the audible range, and which are typically at 1070 and 1270 Hz. The originate modem 16 is also capable of receiving and demodulating digital information signals sent from an answer modem which constitutes a part of the passive station 28. The answer modem signals are transmitted by switching back and forth between two other audible frequencies which are typically 2025 and 2225 Hz.

The station 28 is referred to as a "passive" station because its mode of operation is correctly characterized as passive in nature. Thus, whenever communications are established with the central station 10, the passive station 28 does nothing except issue a stand-by signal to the central station indicating that it is on the line and ready and waiting for commands from the central station. This stand-by (ready-for-command) signal is often referred to below as simply the "ready" signal. This passive mode of operation is followed even when the passive station 28 initiates a call through its own dial-out unitl (not shown in FIG. 1) to the central station. Communications are thus carried out completely on the basis of commands sent from the central station to the passive station. The passive station contains only the logical circuits and apparatus necessary for the purpose of responding to those commands to carry out control functions at the local station, or to supply information to the central station. Whenever a command is completed, the passive station issues a special signal confirming execution of the command, and then again issues the ready signal, waiting for a new command from the central station. The passive station 28 does not even issue its own identification signal to the central station except in response to a command from the central station. Furthermore, when there is an alarm call-out from the passive station to the central station, the only signal received from the local passive station by the central station is the ready signal, until the central station sends commands to the passive station to elicit information.

While only one telephone line 18 is illustrated as connecting the central station to its local telephone exchange 20, typically there will be several telephone lines with one or more of such lines assigned only for the purpose of receiving incoming alarm calls. This prevents routine communications from the central station to local stations from interfering with incoming communications from other local stations having alarm conditions.

Since the station 28 is always passive in its operation, the mode of operation, once communications are established, is always typical of communications originating from the central station. Thus, the communications are always carried out using the originate modem 16 at the central station and a corresponding answer modem in the passive station. In typical prior art data communications systems where communications can be initiated from either end, each call originating station typically has its own originate modem, and each call answering station typically has its own answer modem. Communications are then carried out between the originate modem of the station which originated the call and the answer modem of the station which answered the call. However, since the communications in the present system are always carried out in the same manner, with the passive station 28 remaining passive even when the call is originated at the passive station, only a single modem is required at each station: the originate modem 16 at the central station, and an answer modem at the passive station. Thus, there is a substantial economy in equipment at both stations.

Because the passive station includes an information processor which is capable of receiving commands from the central station and carrying out those commands, there is a need for the passive station to indicate to the central station whenever a command has been completed, and the passive station is ready to receive a new command. In order to maintain the processor at the passive station as simple as possible, it preferably has no memory which stores a series of commands to be performed in sequence. Rather, it simply executes one command at a time, and then indicates by means of the ready signal that it is ready for a new command. The presence of the capability of carrying out logical operations in response to commands in the passive station also brings with it the need for dealing with the problem that a command may be received which cannot be executed, either because the command is incorrect, or for some other reason. The usual method for handling this problem would be to incorporate branching circuits in the passive station which would send information back to the central station as to why the command could not be completed. A further command might then be sent from the central station to reset the passive station and then new commands might be sent out. However, in order to simplify the structure of the passive station as much as possible, instead of incorporating such branching circuits, the passive station simply incorporates a timing mechanism which is continually reset by the successful transmission of data. If the transmission of data is interrupted by reason of a command which cannot be excuted, or some other occurrence, including a possible malfunction of the apparatus, then the timing mechanism times out, and automatically clears the logic circuits and causes a ready signal to be emitted, thus telling the central station that the passive station is again ready to receive commands. In one preferred embodiment of the system, the time out period for this reset timer is 40 seconds. Preferably, the timing means is reset only in response to transfer of information from the passive station to the central station. Thus, if the central station has been attempting to communicate with the passive station without success, the timing cycle is not interrupted, and the passive station is reset as soon as no information has been sent from it for period of 40 seconds.

Initially, upon the establishment of communications between the central station 10 and the passive station 28, there is no communication with either of the satellite stations 42 or 44. However, two of the commands from the central station which may be executed by the passive station are respectively to connect communications through the passive station to the first or second satellite stations 42 or 44 respectively. Once communications are set up with a satellite station, that station is operable to receive and execute commands from the central station in very much the same manner as described above for the passive station. Operations begin with transmission of a ready signal by the satellite which is distinctive from the passive station ready signal.

In order to deal very simply with the problem of switching communications back to the passive station, a very simple automatically operated second timing circuit similar to the first timing circuit described above is included in the passive station to determine when there is an interruption in transmission of data from the satellite station back to the central station. This again is a timing circuit which is continually reset by the transmission of data, but which times out if no data is transmitted. Time out causes transfer of communications from the satellite station back to the passive station. The central station is notified of this transfer by the distinctive ready signal from the passive station. In a preferred physical embodiment, this second time out period is about twenty seconds. This twenty second timer also serves the function of clearing the communication system whenever there is a malfunction of the satellite station, or a failure to carry out a command, or any other circumstances which results in an interruption of data transmission from the satellite station. Thus, the second time out circuit provides a reset function in addition to the function of automatically reestablishing communications with the passive station. If the central station desires to continue to communicate with the satellite station, a command is again issued to the passive station to re-establish communications with the satellite station.

As a further precaution against having the apparatus tied up and the telephone lines continuously engaged so as to prevent the possibliity of attempts to reach the passive station in case of temporary malfunction, there is a third timing means which operates over a timing interval which is generally somewhat longer than the entire interval for which communications will usually continue between the central station and the passive station on any one occasion. This third timing means causes a disconnection of the passive station from the telephone line at the end of the timing interval. This sets up the passive station circuits to receive another incoming call. If the central station desires further communication, then it can again dial up the passive station and establish the connection for a new timing inteval.

The satellite stations 42 and 44 preferably each include an alarm call-out capability similar to that of the passive station upon the occurrence of alarm conditions of the associated navigation aid transmitters and monitors. Such a satellite station alarm is very simply processed by the passive station as an additional passive station alarm condition which causes the usual alarm call-out from the passive station back to the central station.

All of the distinctive alarm conditions which may cause a call-out from the passive station to the central station are recorded in a storage register within the passive station which is referred to as a "status" register. Thus, an alarm condition call-out from one of the satellites is recorded in the status register of the passive station as the distinctive condition which resulted in the call-out. Accordingly, when the central station receives a call from one of the local passive stations, and the call results in a simple transmission of a "ready" signal from the passive station, the central station routinely commands the passive station to transmit the information stored in its status register so that the central station can know what the alarm condition is. Each passive station also includes a status register. If the passive station status register contents indicate that the call-out was initiated because of a satellite alarm condition, then the passive station is commanded to transfer communications to that satellite, and the satellite status register is interrogated to find out what the exact alarm condition is.

Whenever communications are established between the central station and the passive station, no matter which station initiated the communications, the automatic call-out circuit of the passive station is disabled in order to avoid any confusion or ambiguity in signals resulting from further call-out attempts because of alarm conditions arising during communication. However, the status register is usually read by the central station immediately after communication is established, and then the status register is immediately reset. Then, during the course of the communications, if any alarm conditions occur, those alarm conditons are stored in the status register as fresh signals. The central station then again commands a reading of the status register just before completion of communications in order to determine whether any alarm conditions occurred during the interval of communication.

The passive station, and each of the satellite stations, preferably include two data memories, memory A which stores a set of data about the operating conditions of the associated transmitter and monitor at a particular time interval, such as at an appointed hour each day, and a memory B which records the same data upon the occurrence of a monitor alarm condition which is of a nature which is serious enough to cause an automatic shutdown of the navigation aid transmitter. By this means, the central station may obtain successive periodic sets of data on the navigation aid transmitters at uniform intervals, and may have alarm condition data available to assist in diagnosing the nature of the problem which led to the alarm.

In one preferred embodiment of the invention, upon the first occurrence of a monitor alarm condition, operating data is first stored in memory B, and then the system is shut down. However, after a brief interval, the system is automatically restarted on the assumption that the operating condition which caused the monitor alarm may have corrected itself. If the alarm condition has not changed, or if there is another monitor alarm at any later time after the first monitor alarm, and before the status register is reset, then the operating data is again recorded, this time in memory A, and the system is shut down and not automatically restarted. Furthermore, the call-out routine is initiated from the passive station to the central station for the purpose of notifying the central station that the system is shut down. Both monitor alarm conditions are recorded in separate portions of the status register. Because of the multiple storage of data, the central station has available a history of the operating conditions represented by the data stored in memory A and memory B for the purpose of indicating the nature of the problem for rapid diagnosis and remedy. One of the routine commands sent by the central station to the passive station whenever communication is established is to clear the status register after reading the status register so that subsequent status events can be recorded. Preferably, when memory A is stored with alarm condition data, an interlock circuit is operative to prevent the routine timed storage of data in that memory.

The central station computer 12 is preferably programmed to periodically dial out and establish communications with all of the various passive stations at all of the locations served by the central station at least once every 24 hours, going through a series of commands to the passive station to elicit and store information in a computer memory at the central station. The stored information may then be processed in the computer 12, or may be removed from the memory of that computer and processed eleswhere.

The computer 12 may also be programmed to deal with alarm condition calls originated from the various passive stations. However, it is generally desirable to have a capability for the computer to signal to a human operator at the central station that alarm conditions exist, and means are preferably provided at the central station for intervention by the human operator if necessary. Such intervention will generally be carried out with the assistance of at least a part of the computer 12.

Figure 2:
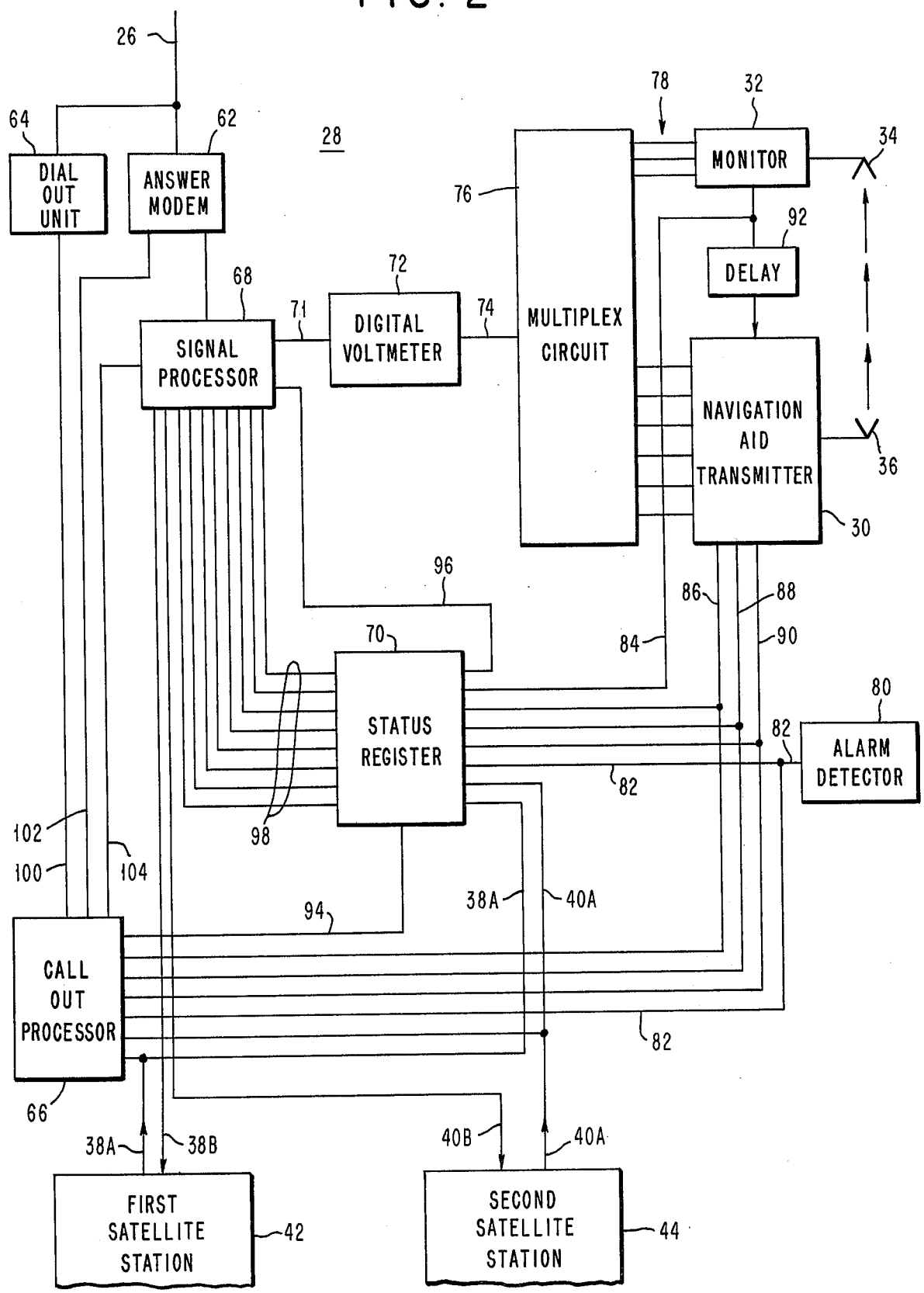
FIG. 2 is a more detailed schematic diagram of the passive station 28 of FIG. 1, and also illustrating the associated navigation aid transmitter 30 and monitor 32, and parts of the associated first and second satellite stations 42 and 44.

FIG. 2 is a more detailed schematic diagram of the passive station 28 of FIG. 1 and also illustrating the associated navigation aid transmitter 30 and monitor 32, and parts of the associated first and second satellite stations 42 and 44. These additional elements are illustrated to provide a more complete understanding of their interrelationships with the passive station. Also illustrated in FIG. 2 is the telephone line 26 through which the passive station communicates with the central station through the telephone equipment.

Communication through the telephone line 26 is carried out by means of the answer modem 62 which is a modulator-demodulator as previously referred to above, which demodulates digital information carried on two audible tones 1070 and 1270 Hz from the central station and sends out digital information by generating and modulating two audible tone frequencies at 2025 and 2225 Hz. The digital signals are modulated or encoded upon the two frequencies of each pair by simply keying back and forth between the two frequencies. When a call is originated at the passive station, that operation is carried out by means of a dial out unit 64 which emits conventional dial pulse signals under the control of a call-out processor 66.

All of the commands to the passive station are carried out by a main signal processor 68. The status register, which is described above, is indicated at 70.

The signal processor 68 includes memory A and memory B for the storage of data as mentioned above. The data information, for the most part, consists of meter readings, such as voltmeter readings, expressed in digital form. In order to obtain these readings, the passive station includes a connection 71 from the processor 68 to a digital voltmeter 72 which is connected in turn at 74 to a multiplex circuit 76. The multiplex circuit 76 has a series of connections, generally indicated at 78, to different test points within the monitor 32 and the navigation aid transmitter 30. When actuated by the signal processor 68, the multiplex circuit 76 goes through a sequence of operations to connect the various test points within the monitor and the navigation aid transmitter to the digital voltmeter 72. The digital voltmeter 72 converts the detected values to digital signals which are stored in serial sequence in memory A or memory B within the signal processor 68.

Alarm conditions which may be stored in the status register 70, and which may result in actuation of the call-out processor 66 to call out to the central station may include exterior conditions at the site of the station, and the alarm condition detector 80 is provided to detect such alarm conditions. One such condition may be, for instance, the presence of an intruder. One simple intrusion detector may simply consist of a door-actuated switch on the door to the cabinet containing the equipment of the navigation aid transmitter. Thus, if an unauthorized person opens the cabinet, the alarm signal is immediately registered in the status register, and the call-out processor 66 is immediately signalled to commence the call-out routine. These purposes are accomplished through connection from alarm detector 80 to status register 70 and to call-out processor 66 indicated at 82.

The other conditions which are detected and stored in the status register are typically conditions of the monitor 32, or of the navigation aid transmitter 30, as indicated by signals on conductors 84, 86, 88, and 90. When there is a signal from the monitor 32 indicating a monitor alarm condition which is to shut down the navigation aid transmitter 30, the monitor alarm signal appears on connection 84 which sets one of the stages of the status register to indicate that a monitor alarm has occurred. The signal from the monitor then continues through a delay circuit 92 and is ultimately delivered to the navigation aid transmitter 30, causing it to shut down. At the same time that the status register receives a signal on connection 84, a signal is also provided to the processor 68 through one of the connections 98 to initiate the data reading sequence by the multiplex circuit 76 to store a set of operating data in memory B, as previously mentioned above. After a certain delay, the monitor automatically commands the transmitter 30 to restore service. If the alarm condition persists, the monitor again emits an alarm signal which is detected by the status register at connection 84 setting a second stage in the status register indicating a second monitor alarm, and causing the initiation of the call-out processor through a connection 94 from the status register 70 to the call-out processor 66. The second monitor alarm also causes the transmitter 30 to be shut permanently down, and causes a second set of data to be stored in memory A during the delay interval of delay device 92 before shutdown.

During normal routine operation of the system, the signal processor 68, at a pre-selected time of day, causes the operation of the multiplex circuit 76 to take a set of data readings which is stored in memory A of the signal processor. When this occurs, a signal is sent through connection 96 from the signal processor 68 to the status register 70 to store the information that the routine time of day data has been taken. This is one routine condition which is stored in the status register and which does not result in an alarm call-out.

Other status conditions which are stored in the status register are generally alarm conditions of the navigation aid transmitter 30 which also initiate the call-out routine. For instance, a signal on connection 86 from the transmitter 30 may indicate a power failure of a reference frequency signal generator. Similarly, a signal on connection 88 may indicate a frequency alarm condition in which the transmitter frequency is outside of the permitted frequency tolerance range. Still another signal, on connection 90, may be used to indicate a power failure.

The other alarm conditions which are stored in the status register, and which require operation of the call-out processor 66, are the alarm call-out conditions from the first satellite station 46 or the second satellite station 48. These signals appear respectively on connections 38A and 40A. These connections are preferably separate from the connections 38B and 40B from the passive station signal processor 68 to the respective satellite stations 46 and 48. The last-mentioned connections are the connections by means of which communications are set up through the passive station to the satellite stations from the central station.

A series of connections 98 are provided from the status register 70 to the signal processor 68 to enable the signal processor to read the information stored in the status register 70 in response to a command from the central station.

During call-out operation by the passive station, the call-out processor 66 energizes the dial-out unit 64 through a connection 100. Call-out processor 66 also is connected to the answer modem 62 through a connection 102 to detect the presence of a modem tone from the central station as an indication that the central station has answered the call. As previously mentioned above, whenever communication is established between the central station and the passive station, the call-out function is disabled to avoid a confusion of signals. Accordingly, an inhibit signal connection 104 is provided from the signal processor 68 to inhibit the operation of the call-out processor 66 whenever communications have been established between the passive station and the central station.

Figure 3:
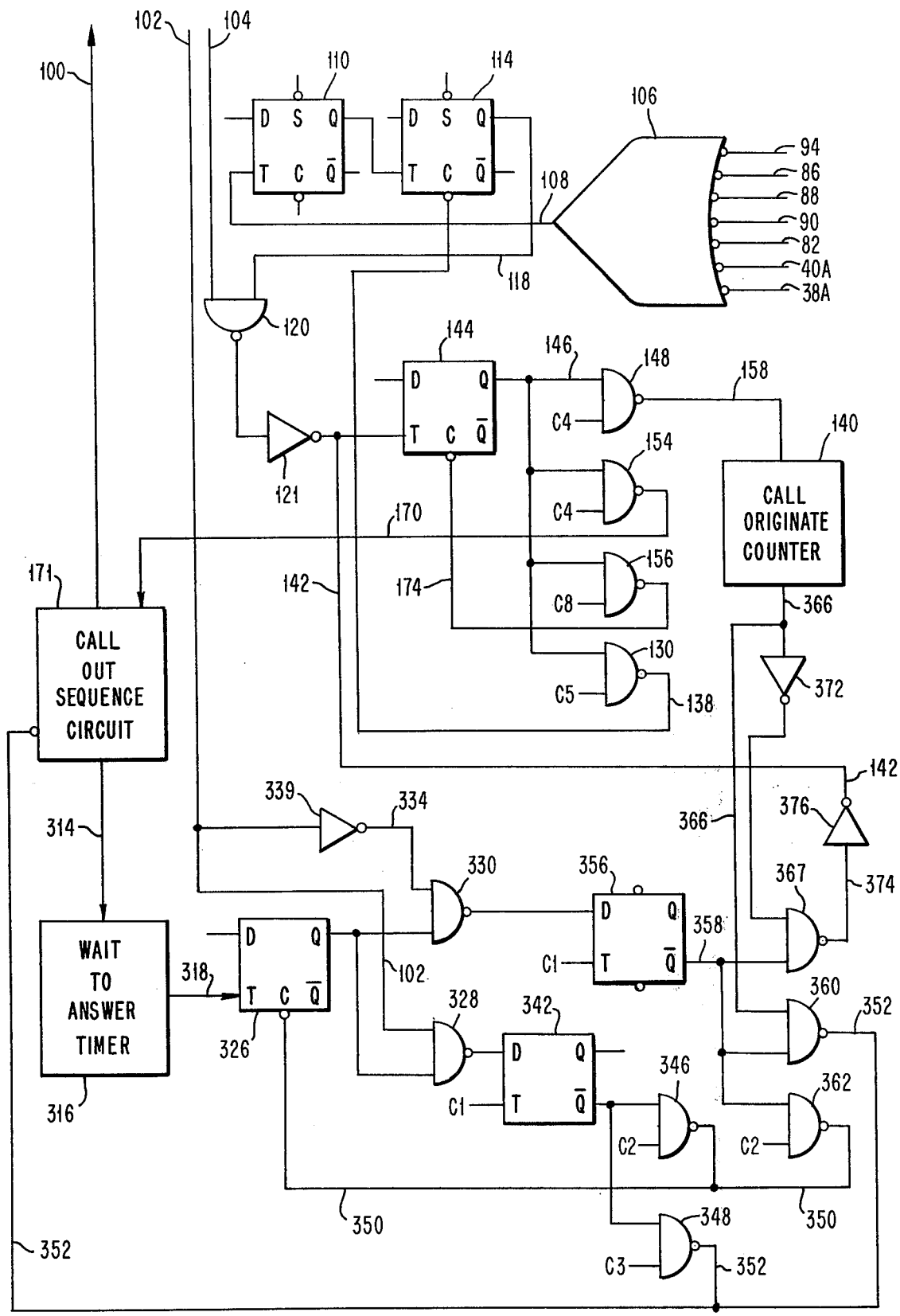
FIG. 3 is a more detailed schematic logic circuit diagram of the call-out processor 66 of FIG. 2 which forms a part of the passive station 28 of FIG. 1.

FIG. 3 is a more detailed schematic logic circuit diagram of the call-out processor 66 of FIG. 2. In this logic circuit diagram, a NOR logic gate 106 is employed. This gate provides a logic 0 output as long as all of the input signals are logic 1. If any of the inputs go to logic 0, the output of the gate is a logic 1. In the present circuit, the NOR gate 106 is used to provide a logic "OR" function by detecting any of the alarm call-out conditions. These are the conditions described above which result in the initiation of a call-out operation to the central station. Thus, all of the inputs 94, 86, 88, 90, 82, 40A, and 38A are normally logic 1. However, if an alarm call-out initiation condition exists, the signal on one of these connections goes to a logic 0, resulting in a change in the signal on the output of the gate at connection 108 from logic 0 to logic 1. This provides a triggering signal to the T-trigger input terminal of an associated bistable circuit (flip-flop) 110.

The flip-flop 110 typifies the flip-flops used throughout the drawings. It operates in the following manner: When triggered by a signal at terminal T, it assumes a state dicated by the data signal at terminal D. A logic 1 input at terminal D results in a "set" state resulting in a logic 1 output at the output terminal Q and a logic 0 output at terminal $\overline{Q}$. The circuit also operates in this manner if no input is connected to terminal D (as indicated for flip-flop 110). However, if the data signal at terminal D is a logic 0 at the time of reception of the trigger signal at terminal T, the flip-flop is placed in the cleared state in which there is a logic 0 output at terminal Q and a logic 1 output at terminal $\overline{Q}$. Logic 0 signals at the input terminals S or C provide for the flip-flop to be set, or cleared, respectively, regardless of the signals available at terminals D and T.

In the specific case of flip-flop 110, when no signal is shown as applied to terminal D, the flip-flop operates as though a logic 1 is present. Therefore, whenever there is a call-out initiation signal on terminal T, the flip-flop 110 is set, providing an output at terminal Q. The flip-flop 110 may be an additional flip-flop within the status register (previously described above) which indicates that a call-out operation has been initiated. At a later time, when the status register is cleared, a signal is applied to terminal C of flip-flop 110 to clear that flip-flop along with the other flip-flops of the status register.

In one physical embodiment, the logic 0 and logic 1 signals have nominal values of 0 volts and plus 5 volts respectively.

The Q output from flip-flop 110 is applied as the trigger input to terminal T of a flip-flop 114, causing that flip-flop to set to provide a Q output at connection 118 which is applied as one of the inputs to a NAND 120. The NAND gates of the present drawings, as typified by gate 120, are illustrated as having a shape different from the NOR gate 106 described above, and the logic function of the NAND gate is different from the NOR gate. Thus, the NAND gate provides a logic 0 output whenever all inputs are logic 1. If one or more of the inputs are logic 0, the output of the NAND gate is logic 1. The NAND gates are often referred to hereinafter simply as "gates".

The other input to NAND gate 120 is provided on a connection 104 from the main signal processor 68 of FIG. 2. If there is no inhibit to be imposed by the main processor 68, because communications have not been previously established, then a logic 1 signal appears on connection 104 permitting an output logic 0 signal from gate 120. In the absence of such a logic 1 signal on connection 104, the operation of the call-out circuit is inhibited, as previously described above in more general terms.

When gate 120 is operated by the two logic 1 inputs, the result is a logic 0 output to an inverter 121, which consequently provides a positive going pulse on a connection 142 to the T-input of a flip-flop 144. This results in the setting of flip-flop 144, providing an output at the Q terminal connection 146 and enabling NAND gates 148, 154, 156 and 130. A series of clock pulse signals are available in the present system and they consist of positive going pulses which are available in sequence, the individual pulses being identified as C1, C2, C3, and up through C10, and then the sequence is continuously repeated starting again with C1. Thus, at the first C4 clock interval after the setting of flip-flop 144, both of the gates 148 and 154 are operated. Gate 148 then provides an output at connection 158 to advance input of a call-originate counter 140 to advance the counter by one count. Counter 140 is referred to as the call originate counter because it is used to limit, to a predetermined number, the attempts made by the system to call out in response to an alarm condition. For instance, in one preferred physical embodiment, four attempts are made to call out before the system stops trying to call out. It is believed that the probabilities of success are quite low if success has not been achieved in four tries, and the system should not be continuously tied up with unsuccessful call-out attempts. Accordingly, the signal on 158 simply advances the count in the call originate counter 140 so that the number of attempts at call-out is stored for future reference.

Gate 154 provides an output on connection 170 to initiate the operation of call-out sequence circuit 171. At clock pulse C5, gate 130 provides a signal on connection 138 to clear flip-flop 114. At clock pulse C8, gate 156 provides a signal on connection 174 to clear flip-flop 144. Similar signals must be provided to other flip-flops in the circuit for restoring them to their original state. Also, the counter circuit 140 must be periodically cleared. However, some of these details are omitted to avoid unnecessary complication of the present description.

When actuated, circuit 171 issues a series of dialing pulses on connection 100 to the dial out unit 64 of FIG. 2. The pulses correspond to the required telephone dialing pulse sequence for calling the telephone number of the central station which is to be called under alarm conditions. For direct distance dialing, this typically includes eleven decimal digits, the first digit being decimal 1, the next three digits being the area code, and the last seven digits being the local telephone number. When the dial out sequence has been completed, the call out sequence circuit 171 issues a signal on connection 314 to a wait-to-answer timer 316. This is referred to as a "wait-to-answer" timer since the output signal from the timer at connection 318 is used to test whether or not the central station has answered the call. The signal on connection 318 is supplied to the trigger input of a flip-flop 326 to set that flip-flop. The resultant set output signal is supplied as an enabling input to two gates 328 and 330 which are operable then to detect a "clear-to-send" signal at the input connection 102 to gate 328, or a "not-clear-to-send" signal at input connection 334 of gate 330.

The clear-to-send signal is a logic signal appearing at connection 102 derived from a modem tone signal received at the answer modem 62 (FIG. 2) from the central station modem 16 (FIG. 1), indicating that the central station is on the line and that connections have been established from the passive station to the central station. If this condition exists, there is a resultant logic 0 output from gate 328 which is connected to the data input "D" of a flip-flop 342. Consequently, on the next C1 interval, flip-flop 342 is cleared, resulting in an enabling output at the $\overline{Q}$ terminal to gates 346 and 348. At the C2 interval, gate 346 provides a signal on connection 350 to clear flip-flop 326. At the C3 interval, gate 348 provides a signal through the connection 352 back to the call-out sequence circuit 171 to disable the call-out sequence circuit, since no further call-out attempts need be made. This terminates the call-out procedure.

However, if the not-clear-to-send signal is present, it indicates that the call-out operation has not been successful. In this instance, a logic 0 signal is available on connection 102 which is inverted to a logic 1 in an inverter 339, and supplied on connection 334 to activate gate 330. Gate 330 then provides a logic 0 output signal to the data input of a flip-flop 356, causing that flip-flop to be cleared on the next succeeding clock C1 pulse supplied to the trigger input. The resultant output from flip-flop 356 appearing on connecton 358 enables gates 360, 362, and 367. At the next C2 clock interval, gate 362 provides an alternate signal on connection 350 to clear flip-flop 326.

Gate 360 includes an input at connection 366 for the purpose of detecting whether or not the prescribed maximum number of call-out attempts have been made. This signal is obtained from the call originate counter 140. If this condition exists, the resultant logic 1 signal actuates gate 360 to provide a logic 0 output at connection 352 to turn off the call-out sequence circuit 171, thus terminating the call-out procedure.

Gate 367 is connected to receive, through an inverter 372, the logical inversion signal of the maximum count signal supplied on connection 366 from the call originate counter. Thus, when the signal from inverter 372 is a logic 1, it means that the maximum count has not yet been reached, and an additional attempt should be made to call out. Accordingly, gate 367 is then operable to supply a logic 0 output to a connection 374 and thus to an inverter 376. Inverter 376 then provides a logic 1 signal on connection 142 to the T-input of flip-flop 144, to again begin the operation of the call-out sequence circuit 171.

Figure 4A:
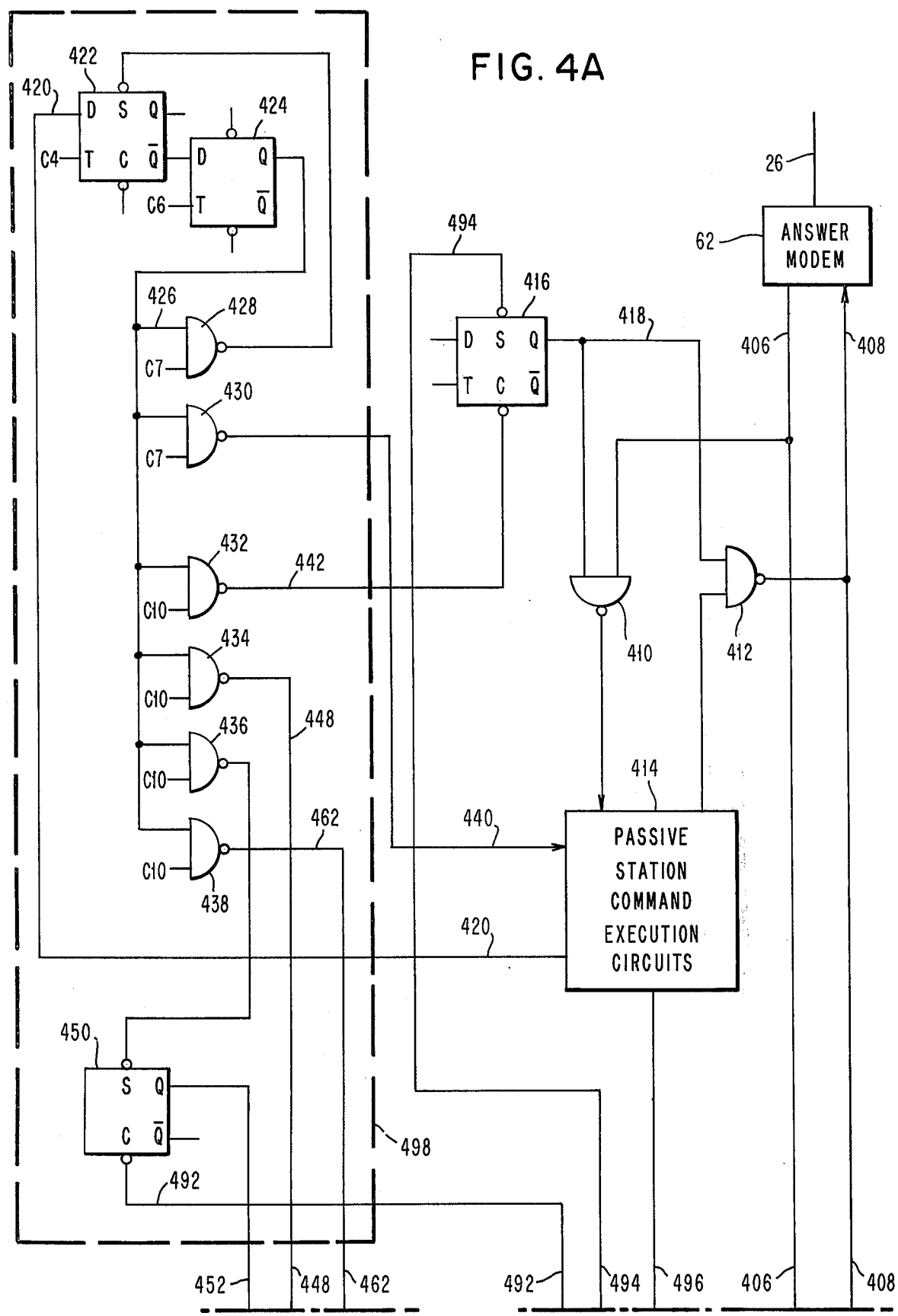
FIGS. 4A and 4B (sometimes referred to collectively hereinafter simply as FIG. 4) together constitute a more detailed schematic diagram of certain features of the circuits of the passive station 28 of FIG. 1 which have the particular function of controlling communications with the satellite stations.
Figure 4B:
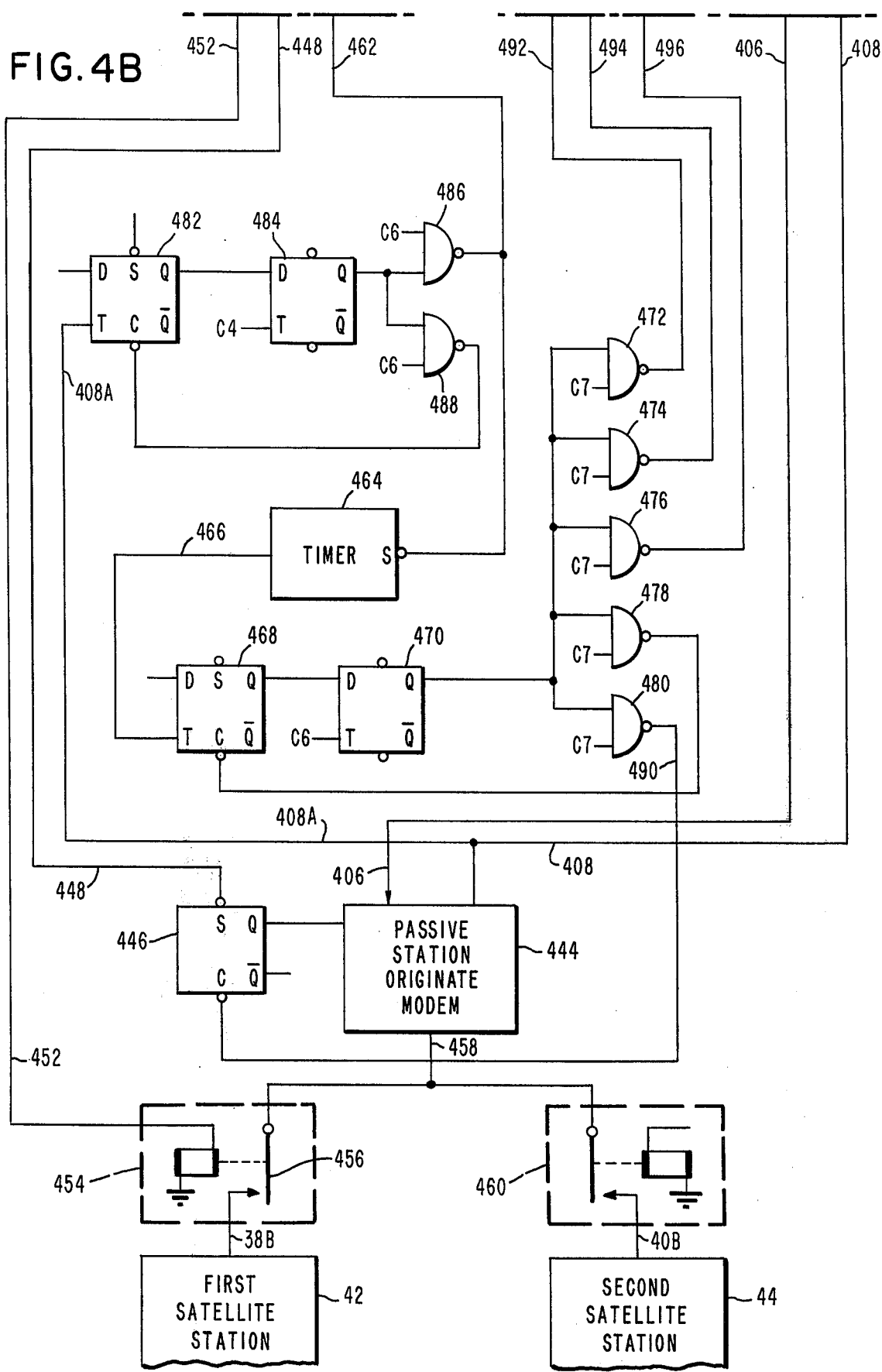

FIGS. 4A and 4B together constitute a more detailed schematic circuit diagram of certain features of the circuits of the passive station which have the particular function of controlling communications with the satellite stations. FIGS. 4A and 4B should be considered together. The uppr edge of FIG. 4B should be placed adjacent to the lower edge of FIG. 4A to form a combined two sheet figure. FIGS. 4A and 4B may be collectively referred to below as simply FIG. 4.

In FIG. 4, certain features of the apparatus illustrated in FIG. 2 are repeated. For instance, the answer modem 62 is illustrated in the upper right-hand corner of FIG. 4A, and the first and second satellite stations 42 and 44 are illustrated at the bottom margin of FIG. 4B. All of the remainder of the apparatus illustrated in FIG. 4 (FIGS. 4A and 4B) constitutes a part of the passive station signal processor 68 of FIG. 2.

As previously mentioned in connection with the description of FIGS. 1 and 2, communications between the passive station and the central station are carried on through the telephone line 26 in the form of modulations of tone signals transmitted and received by the answer modem 62. The digital information received by the answer modem 62 is demodulated and it appears at an output connection 406 of the answer modem as a train of DC logic pulses. Outgoing digital logic signals appear as a train of logic pulses at an input connection 408 to the answer modem where they are modulated and sent out on the telephone line 26 to the central station.

When communications are being carried on between the passive station and the central station, incoming digital signals are normally sent from modem 62, through connection 406, and through a gate 410, to the passive station command execution circuits 414. Similarly, outgoing digital signals are normally connected from the passive station command execution circuits 414 through a gate 412 and connection 408 to the answer modem 62. Under these conditions, gates 410 and 412 are normally enabled by a passive station communications control flip-flop 416 which is normally in the set state.

When a command is received to transfer communications to the first satellite station 42, a signal is emitted from the passive station command execution circuits 414 on connection 420 which is supplied as a logic 0 signal to the data input of a flip-flop 422. On the next following C4 clock pulse, flip-flop 422 is triggered to the cleared state to provide a logic 1 to the data input of an associated flip-flop 424. On the next following C6 clock pulse, flip-flop 424 is triggered to the set state providing an enabling output on connection 426 to all of the NAND gates 428–438. Gates 428 and 430 are then operated on the next following C7 clock pulse. Gate 430 provides a signal on connection 440 back to the passive station command execution circuits 414 to remove the command signal from connection 420 to flip-flop 422. At the same time, gate 428 provides a signal to set the flip-flop 422.

Gates 432–438 are all operable on the next following C10 clock pulse. Gate 432 provides a signal on connection 442 to clear the passive station communications control flip-flop 416 to thereby disable both of the gates 410 and 412 to prevent further signals from being received or transmitted between the passive station command execution circuits 414 and the answer modem 62. Thus, this releases the connections 406 and 408 to exclusively serve the satellite station. For this purpose, connections 406 and 408 extend directly downward in the diagram to a passive station originate modem 444. This modem is similar to the originate modem in the central station, previously described above, in terms or the frequencies it employs. It operates to send and receive digitally modulated tone pairs back and forth between the passive station and the satellite stations. The connections 406 and 408 are connected directly between the answer modem 62 and the passive station originate modem 444 without any interlock gates. However, the passive station originate modem 444 is not enabled, and is inoperable during communications directly between the central station and the passive station, the operability of modem 444 being controlled by a flip-flop 446. Flip-flop 446 is normally cleared when communications are being carried on between the passive station and the central station.

However, when gate 434 is operable, a signal is provided on connection 448 to the set input of flip-flop 446 to provide an enabling output to the modem 444. At the same time, the signal from gate 436 is operable to set a flip-flop 450 which then provides an output signal on connection 452 to operate a relay 454. Relay 454 then completes a connection through contacts 456 from the first satellite telephone line 38B to a common telephone line input-output connection 458 to the modem 444. A similar relay 460 is provided to alternatively connect modem 444 to the second satellite station 44.

At the same time, gate 438 provides a signal on a connection 462 to set and initiate the operation of a timer 464. If the timer 464 is not again set and restarted before it times out, the resultant output signal which appears on connection 466 results in the operation of flip-flops 468 and 470 and the gates 472–480 to disconnect the satellite station communication connections described above, and to re-establish the passive station communications.

However, during data transfers (communications) from the satellite, the timer 464 is being repeatedly set and restarted so that it does not time out. This function is accomplished by the detection of data transmitted from the satellite station through modem 444. When such data is transmitted, it appears on connection 408 as a train of digital pulse signals. These digital signals are connected through an auxiliary circuit connection 408A to the trigger input of a flip-flop 482, causing flip-flop 482 to be set, and thus providing a logic 1 data input to an associated flip-flop 484. Flip-flop 484 is then triggered to the set condition at the next C4 clock pulse received at its trigger input to enable the associated gates 486 and 488. These gates are both then operated on the next following C6 clock pulse interval. Gate 486 provides an output directly to connection 462 to again set and restart the timer 464 to prevent it from timing out. Gate 488 is operable to provide a signal which clears flip-flop 482. Thus, flip-flop 482 is again ready and waiting to detect the transmission of additional data which will result in a repeated setting and restarting of timer 464. In this manner, timer 464 is never permitted to time out, unless there is an interval corresponding to the timing interval of timer 464 in which no data is received from the satellite station. As previously mentioned above, in one physical embodiment, the timer interval is conveniently selected to be twenty seconds. However, different timing intervals could be selected based upon design and operating requirements.

When the timer 464 times out, the resultant signal on connection 466 triggers flip-flop 468 to the set condition providing a logic 1 to the data input of the associated flip-flop 470. On the next succeeding C6 clock pulse, flip-flop 470 is triggered to the set condition, enabling all of the gates 472–480. These gates are all then operated at the next succeeding C7 clock pulse interval. Gate 478 is connected to provide a clear signal to flip-flop 468. Gate 480 provides a signal on connection 490 to clear flip-flop 446 to disable modem 444 and to thus discontinue communications with the satellite. Gate 472 provides a signal on connection 492 which clears flip-flop 450 and de-energizes relay 454 to disconnect the modem 444 from the satellite station telephone line 38B. Gate 474 provides a signal on connection 494 to set the passive station communications control flip-flop 416 to re-enable the gates 410 and 412 to re-establish communication connections between answer modem 62 and the passive station command execution circuits 414. Gate 476 provides a signal on connection 496 to the passive station command execution circuits 414 to initiate the transmission of a ready signal from the passive station to the central station indicating that direct connections have been re-established with the passive station and thus notifying the central station that communications with the satellite have been discontinued. The satellite stations also issue ready signals. However, the ready signals issued by the satellite stations are each distinctive from one another, and distinctive from the ready signals issued by the passive station. Thus, the central station is always informed by the content of the ready signal as to which station it is in communication with.

All of the apparatus described above which is enclosed within the dotted box 498, together with the relay 454, is dedicated to the control of communications to the first satellite station 42, and is not used for control of communications with the second satellite station 44. Equipment which duplicates that illustrated within the box 498 is provided for alternatively controlling communications with the second satellite station 44. All of the other circuits and circuit elements illustrated in the drawing serve in common for communication with either satellite, and are controlled either by the circuits within box 498, or by the corresponding control circuits which are not illustrated for communication with the second satellite station 44.

Earlier in the specification, reference is made to a timer similar to timer 464, which "timed out" in the absence of data transmission from the passive station back to the central station, and which caused a clearing of the command execution circuits of the passive station on such time-out operation. That timer is not separately illustrated and described in detail here because it is substantially similar to the timer 464, and the circuits for detecting data transmission and for continually setting and restarting that timer are substantially similar to the flip-flops 482 and 484, and the gates 486 and 488 described here in conjunction with the operation of the timer 464.

Figure 5:
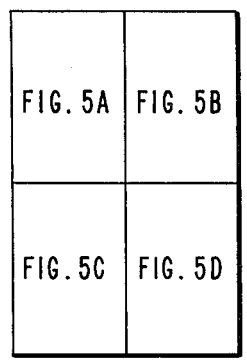
FIGS. 5A, 5B, 5C, and 5D together comprise a much more detailed logic circuit diagram of the call-out processor 66 of FIG. 2, as previously presented in a more simplified form in FIG. 3.
Figure 5B:
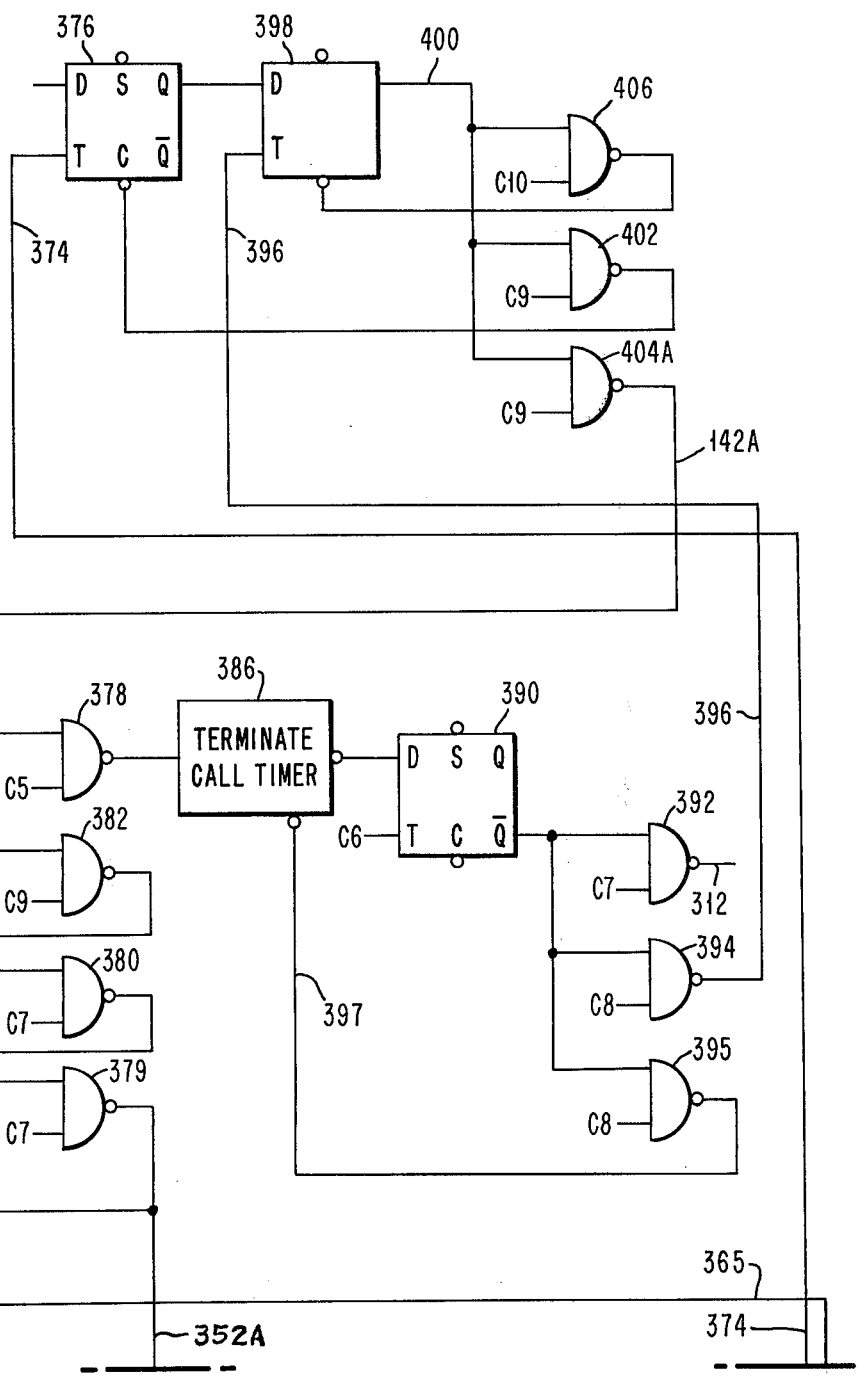

FIG. 5 is a much more detailed logic circuit diagram of the call-out processor 66 of FIG. 2, and as previously presented above in simplified form in FIG. 3. FIG. 5 consists of a combination of FIGS. 5A, 5B, 5C, and 5D arranged together in a combination pattern as illustrated in the drawings under FIG. 5. These drawings will be described together below, and will be collectively referred to from time to time simply as FIG. 5.

Insofar as the components illustrated and described in FIG. 5 exactly duplicate components shown and described in FIG. 3, the same component numbers are used as were used in FIG. 3. When somewhat different interconnections are illustrated in the more elaborate presentation of FIG. 5, corresponding components are given the same component number with the suffix letter A. The same types of logic components are used in FIG. 5 as were used in FIG. 3, and the functions of the individual components are described in detail above in connection with FIG. 3. However, for completeness, the entire system of FIG. 5 is described, even where it duplicates the description of FIG. 3 above.

Beginning first with FIG. 5A, the NOR gate 106 is used to provide a logic OR function by detecting any of the alarm call-out conditions. These are the conditions described above in connection with FIG. 2 which results in the initiation of a call-out operation to the central station 10 (FIG. 1). Thus, all of the inputs 94, 86, 88, 90, 82, 40A, and 38A, are normally logic 1. However, if an alarm call-out initiation condition exists, the signal on one of these connections goes to a logic 0, resulting in a change in the signal on the output of the gate 106 at connection 108 from logic 0 to logic 1. This provides a triggering signal to the T-trigger input terminal of an associated bistable circuit (flip-flop) 110. Since no signal is shown as applied to terminal D of flip-flop 110, the flip-flop operates as though a logic 1 is present. Therefore, the flip-flop 110 is set, providing an output at terminal Q. The flip-flop 110 may be an additional flip-flop within the status register (previously described above in connection with FIG. 2) which indicates that a call-out operation has been initiated. At a later time, when the status register is cleared, a signal is applied to the terminal C of the flip-flop 110 to clear that flip-flop along with the other flip-flops of the status register.

The Q output from flip-flop 110 at connection 112A is applied to the T-input of a flip-flop 114. The D input of flip-flop 114 is normally provided with a logic 1 signal so that this flip-flop is set by the T input, thus providing a logic 1 signal at the output Q connection 118. If the call originate operation is to be inhibited, then a normally open switch 116 connected from input terminal D of flip-flop 114 to ground is closed, thus applying a logic 0 signal and preventing the flip-flop 114 from being set. However, it is assumed that switch 116 is open, as shown.

The set (Q) output of flip-flop 114 is supplied on connection 118 as one of the inputs to a NAND gate 120A. The other input to NAND gate 120A is provided on a connection 104 from the $\overline{Q}$ output of a flip-flop 122 which is referred to as the communication flag flip-flop. The communications flag flip-flop is normally a part of the signal processor 68 (FIG. 2). This flip-flop is set whenever communications with the central station are initiated and continued. Conversely, the communications flag flip-flop 122 is clear whenever communications have not yet been initiated and are not being continued. Thus, in the cleared condition, a logic 1 signal appears on the $\overline{Q}$ output of communications flag flip-flop 122 (connection 104). In the absence of such a logic 1 signal, the operation of the call-out circuit is inhibited, as previously described above in more general terms.

Assuming then that there are logic 1 signals on both connections 118 and 104 as inputs to NAND gate 120, the result is a logic 0 output to the D input of a flip-flop 124. Then as soon as a signal C1 is available at terminal T, flip-flop 124 is cleared, providing an output at the $\overline{Q}$ terminal connection 126 and enabling NAND 128, 130, 132, and 134.

Gates 128, 130, and 132 are all then operated by C3 clock pulses to provide logic 0 outputs. The output of NAND gate 128 is supplied through a connection 136 to set the communications flag flip-flop 122. The output from NAND gate 130 on connection 138 is connected to clear the flip-flop 114.

The output from gate 132 is connected to clear a digital counter 140A. Counter 140A is referred to as the call originate counter. It is used to limit to a predetermined number the attempts made by the system to call out in response to an alarm condition. For instance, in one preferred physical embodiment, four attempts are made to call out before the system stops trying to call out. It is believed that the probabilities of success are quite low if success has not been achieved in four tries, and the system should not be continuously tied up with unsuccessful call-out attempts.

At clock time C10, gate 134 is operated to supply an output on connection 142A to a flip-flop 144A. This is the input to the trigger T of flip-flop 144A causing that flip-flop to be set, providing a set output on connection 146A to enable a group of NAND gates 148–156. At the next following "C4" clock interval, all of the gates 148–154 are operated. Gate 148 then provides an output at connection 158 to the advance input A of call originate counter 140A to advance the counter by one count. Gate 150 provides a signal on connection 160 to clear a flip-flop 162, which is referred to as the data terminal ready flip-flop. The data terminal ready flip-flop controls the operation of the answer modem 62. Accordingly, clearing this flip-flop assures that the answer modem 62 is turned off during dialing.

Gate 152 provides an output signal on connection 166 to set a flip-flop 168, which is referred to as the "off-hook" flip-flop. The off-hook flip-flop provides a signal to a NAND gate 169 for transmission of an off-hook signal through an inverter 171 and connection 100 as will be described more fully below.

At the next succeeding C8 clock interval, gate 156 provides a signal on connection 174 to clear flip-flop 144A.

At the preceding C4 clock interval, gate 154 provides an output on connection 170A to start a timer 172 which is characterized as a "wait-for-dial-tone" timer. This timer delays the commencement of the dialing operations until the telephone exchange line-finder equipment has had sufficient time to operate, an interval which is usually measured by the commencement of dial tone from the telephone exchange. A convenient interval for this timer is 8 seconds.

The wait-for-dial-tone timer 172, the off-hook flip-flop 168, the gate 169, and most of the associated apparatus to be described below in connection with FIG. 5, up to the "wait-to-answer" timer 316 are components of the call-out sequence circuit 171 of FIG. 3.

When the wait-for-dial-tone timer 172 has timed out, an output signal is supplied through a connection 176 to the data input of a flip-flop 186 (FIG. 5C). Flip-flop 186 is then shifted to the set state upon the application of the next C5 clock pulse to the trigger T-input of that flip-flop. The resultant set output from flip-flop 186 enables the associated gates 192-198. At the clock pulse interval C7, gate 193 is operable to provide a "clear" signal on connection 199 back to timer 172. Timer 172 includes a latching output flip-flop similar to flip-flop 326 at the output of timer 316 in FIG. 3. However, the latching flip-flop is not separately illustrated in timer 172. The reset signal on 199 resets the latching flip-flop and removes the output signal from connection 176. The other timers 304, 324, and 386 described below also include built-in output latching flip-flops and clear connections for those flip-flops.

Referring again to the other gates associated with flip-flop 186, at clock interval C8, the gates 192, 194, and 196 are operable to clear dial pulse generating apparatus components respectively identified as a digit counter 200, a dial shift register 202 (which is also referred to below as a dial pulse generator), and a dial pulse counter 204 to assure that these componenets are initially cleared before operation is commenced. At the following clock interval C9, gate 198 provides a trigger input at connection 306 to the T-terminal of a flip-flop 206 for commencing a sequence of operations in which the pulses necessary for the dialing out the first digit of the dialed station are generated. Upon triggering, flip-flop 206 is set to provide an output at 212 to enable NAND gates 214, 216, and 218. At the next succeeding clock pulse C10, the gate 214 provides an output signal on connection 220 to set the dial pulse generator shift register 202 so that the generation of dial pulses is commenced. This process is described more fully below.

At the next succeeding clock pulse C2, gate 218 provides an output connected to clear flip-flop 206.

At the next preceding clock pulse C1, gate 216 is operable to provide on a connection 224 a signal operable to trigger and set a flip-flop 226. The resultant set output from flip-flop 226 enables a gate 228 which is operable to receive a signal indicating when the dial pulses for a particular dialed digit are completed by means of a signal received at its other input 230. The source of this dial pulse count completion signal (also called a comparison signal) is described more fully below.

The dial pulse generator shift register 202 is set and enabled by the signal on connection 220 as mentioned above. Three of the data set inputs to this shift register are permanently wired to ground as shown at 232 to provide a logic 0 signal. The other two of the total of five data inputs, as indicated at 234, are not connected to an external source, which means that logic ones are stored for these two shift register positions during the set enable signal. The shift register 202 is continuously clocked by a clock input signal indicated at 236 which may consist for instance, of a clock pulse train at a 55 Hz frequency. The output signal from the shift register appears at the output connection 238, and is supplied through a connection 244 and an inverter 246 as one of the inputs to gate 169 (FIG. 5A). The other input to gate 169 is the off-hook set signal from the flip-flop 168. In the absence of dial pulses at 244, the signal at the input of inverter 246 is logic 0 and the output is logic 1 to gate 169. Thus, in the presence of an off-hook signal from the set output Q of flip-flop 168, there are two logic 1 inputs to NAND gate 169 resulting in a logic 0 output which is inverted in inverter 171 providing a logic 1 output at connection 100. This is referred to as the off-hook output signal. When the dial pulses appear on connection 244, each pulse appears at the output of inverter 246 as a momentary shift from logic 1 to logic 0. Thus, this results in corresponding momentary shifts in the output signal at connection 100 from logic 1 to logic 0. This is the conventional mode of pulses in a telephone system. It may be characterized as a modulation or switching of the off-hook signal, or an interruption of the off-hook signal for each pulse.

In the absence of the off-hook signal from the flip-flop 168, the upper input to NAND gate 169 remains at logic 0, assuring a continuous logic 1 output from that gate which is inverted by inverter 171 to a logic 0. Thus, the output at connection 100 remains logic 0 and no dialing pulses are apparent at connection 100 even if the dial pulse generator is operative in the absence of the set condition of flip-flop 168. The output signal at 238 is also connected as the recirculating input to the dial pulse generator shift register 202 at 242. The output is also supplied on connection 240 as an input to the dial pulse counter 204.

With the input clocking frequency of 55 Hz to the dial pulse generator shift register 202, and with a five bit storage position register, as illustrated, the resultant dial pulses are emitted from the dial pulse generator at a frequency of 11 Hz, and consist of a square wave dial pulsing signal having a 60 percent pulse on (logic 0) interval corresponding to the three stages originally grounded by connection 232, and a 40 percent off (logic 1) portion corresponding to the two inputs 234 to the remaining two positions of the shift register. When the emission of dial pulses is to be interrupted, the dial pulse generator shift register 202 is simply cleared by a clearing signal on the input connection 250, as described more fully below.

The dial pulse counter 204 is a simple binary digital counter which provides digital outputs on connections 252 corresponding to the number of pulses received at the input of the counter. This binary count is compared in a comparator circuit 254 to determine when the desired count of dialing pulses has been achieved. The comparator circuit 254 consists of a group of exclusive OR gates. These exclusive OR gates are each operable to provide a logic 1 output whenever the two inputs to the OR gate are different, but to provide a logic 0 output whenever the two inputs are the same. Accordingly, until there is an exact match of the sets of binary signals into each of the different exclusive OR circuits of the comparator 254, there will be a logic 1 output on one or more of the comparator output circuits 256. The one or more logic 1 outputs are inverted to logic zeros by the inverters 258, and supplied to a four input NAND gate 260. Accordingly, as long as there is not an exact comparison, there will be at least one logic 0 input to NAND gate 260 resulting in a logic 1 output which is inverted by an inverter 262 to a logic 0 output at connection 230. However, as soon as an exact comparison is detected, the inputs to NAND gate 260 are all logic ones, with the result that there is a logic 1 output at connection 230 to gate 228. This provides a signal which terminates the train of pulses for that dialing digit.

Figure 5D:
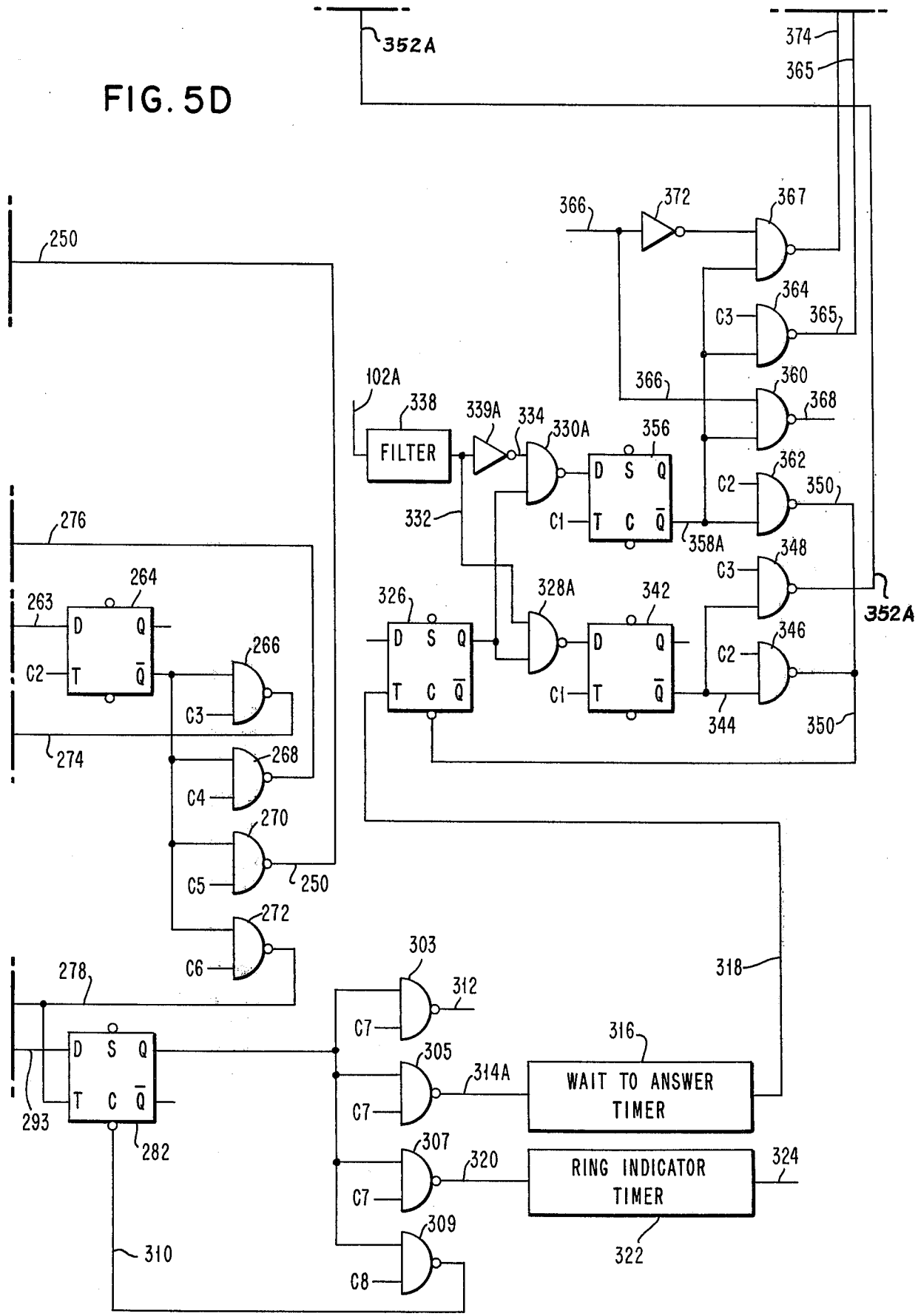

This operation is accomplished as follows. The gate 228 has been enabled with a logic 1 signal from flip-flop 226 from the beginning of the generation of the pulse train. Thus, the arrival of a second logic 1 signal on connection 230 causes the NAND gate 228 to provide a logic 0 output on a connection 263 to the data input terminal of a flip-flop 264 (FIG. 5D). At the next succeeding clock pulse C2 on the trigger input of flip-flop 264, that flip-flop is cleared, providing enabling signals from the $\overline{Q}$ terminal to a series of gates 266, 268, 270, and 272. Thus, at clock interval C3, gate 266 provides a connection at 274 to clear flip-flop 226. At clock interval C4, gate 268 provides a signal at 276 to clear the dial pulse counter 204. At clock pulse interval C5, gate 270 provides a signal at connection 250 to clear the dial pulse generator shift register 202. This is the signal which interrupts the generation of dial pulses by assuring that all stages of the shift register 202 are cleared to the logic 0 state. Finally, at clock interval C6, the gate 272 provides a signal on connection 278 to the trigger inputs of two flip-flops 280 (FIG. 5C) and 282 for the purpose of enabling a detection as to whether or not the last dialing digit of the number being dialed has been dealt with. If so, the dialing procedure is properly terminated. If not, the dialing apparatus is reactivated to issue dialing pulses for the next digit. The operation of these flip-flops 280 and 282 is detailed below.

Referring back again to the digital comparator circuit 254 (FIG. 5C), the correct decimal digit information for comparison with the pulse count from the pulse counter 204 is obtained through connections 284 from a read-only digital memory 286. This is an addressable memory which is addressed by the outputs from the digital counter 200. The read-only memory 286 permanently stores all of the decimal digits of the telephone number of the central station which is to be called up under alarm conditions. For direct distance dialing, this typically includes eleven decimal digits of storage, the first digit being decimal 1, the next three digits being the area code, and the last seven digits being the local telephone number. These digits are addressed in sequence for read-out from the memory 286 by the sequence of address numbers emitted in binary digital form from counter 200 corresponding to decimal numbers zero through ten.

The read-only memory 286 also has an auxiliary output connection indicated at 290 which is energized with a logic 0 signal when the address information from counter 200 is 10, indicating that the last digit has been addressed. This signal is supplied through connection 290 and an inverter 292 as the last dialing digit detection signal at the data input of flip-flop 282. The uninverted signal is supplied directly from connection 290 to the data input connection of flip-flop 280. In this manner, flip-flops 280 and 282 are provided with the information as to whether or not the last digit has been dialed.

As mentioned above, flip-flops 280 and 282 receive trigger inputs from gate 272 after the count comparator signal is obtained, indicating that the current series of pulses for the current decimal dialing digit has been achieved. Accordingly, if the final count has not been achieved, the data input on connection 290 to flip-flop 280 is a logic 1, and flip-flop 280 is set. By contrast, the data input to flip-flop 282 is logic 0 so that flip-flop 282 is not set.

The setting of flip-flop 280 enables a series of gates 294, 296, and 298. On the next succeeding clock interval C7, gate 294 provides a signal on connection 300 to advance the digit address counter 200 so that the next digit is addressed from the read-only memory 286. On the next following clock interval C8, gate 298 provides a signal which clears the flip-flop 280 so that it will be ready for the next set of signals. At the preceding C7 clock interval, gate 296 provides a signal on connection 302 to start a dial rate timer 304. Timer 304 provides a delay in the commencement of the generation of dial pulses for the next succeeding digit to comply with the normal dialing rate interval for which telephone exchanges are designed. When the dial rate timer completes its timing interval, a signal is supplied on connection 306 back to the trigger input of flip-flop 206 to cause another setting operation of that flip-flop to thereby commence the generation of dial pulses for the next digit of the telephone number. For clarity, only the terminal ends of interconnection 306 are illustrated. Timer 304 includes a latching circuit at its output end which is not separatley shown, but which is cleared at clock interval C9 at connection 311. It is at this clear operation that flip-flop 206 is set.

If the last digit has been reached so that the signal is logic 1 at the data input of flip-flop 282 (FIG. 5D) at the end of the dialing pulse train, then flip-flop 282 is set instead of flip-flop 280 by the trigger signal on connection 278. This enables a group of NAND gates 303, 305, 307 and 309. Gate 309 is effective on the next succeeding C8 clock pulse to provide a signal through connection 310 to clear flip-flop 282. However, on the next preceding clock pulse C7, each of the gates 303, 305 and 307 are effective to issue output signals. The output from gate 303 on a connection 312 is connected to set the data terminal ready flip-flop 162 (FIG. 5A) to enable the subsequent operation of the answer modem 62. For clarity, only the terminal ends of interconnection 312 are illustrated.

The output signal from gate 307 on connection 320 is supplied to a timer 322 which is referred to as a ring indicator timer. Timer 322 provides a signal at the end of the timing interval from the output on a connection 324 to the modem 62 (FIG. 5A) to cause the modem to become operable to emit a tone for communication with the central station. For clarity, only the terminal ends of interconnection 324 are illustrated. Timer 322 includes built in output signal latching and clearing circuits which are not shown in detail.

The signal from gate 305 on connection 314 is connected to a timer 316 which may be referred to as the "wait-to-answer" timer since the ultimate output signal which appears at the end of the timing interval at the output connection 318 is used to test whether or not the central station has answered the called.

The signal on connection 318 from the wait-to-answer timer 316 is supplied to the trigger input of a flip-flop 326 to set that flip-flop. The resultant set output signal is supplied as an enabling input to two gates 328A and 330A which are operable then to detect a "clear-to-send" signal at the 332 input of gate 328A, or a "not-clear-to-send" signal at input connection 334 of gate 330A. The clear-to-send, and the inverse not-clear-to-send signals are obtained from the answer modem 62 (FIG. 5A) through a connection 102A and filter 338. For clarity, only the terminal ends of connection 102A are shown. The signal on connection 102A from modem 62 to the filter 338 is derived from the presence of a modem tone signal received at the answer modem 62 from the central station modem, indicating that the central station is on the line and that connections have been established from the passive station to the central station. Filter 338 is a low pass filter. Thus, the signal must persist for a minimum interval in order to be recognized. This avoids confusion derived from spruious transients. If the connections have been successfully completed, a logic 1 output is available at connection 332.

This results in a logic 0 output signal from gate 328A to the data input of a flip-flop 342, causing that flip-flop to be cleared as soon as a trigger input is available to this flip-flop by means of the next succeeding C1 clock pulse. The resultant output from flip-flop 342 on connection 344 enables gates 346 and 348. On the next succeeding C2 clock pulse, gate 346 emits a signal to connection 350 to clear the flip-flop 326. At the next succeeding clock interval C3, gate 348 emits a signal at connection 352A to clear the off-hook flip-flop 168 (FIG. 5A), thus preventing the transmission of any further dial pulses. Thus, the dial out procedure has been completed, since communications have been established, and no further attempts at call-out must be made.

If the not-clear-to-send signal is present rather than the clear-to-send signal, it indicates that the tone from the central station is not available, and the call-out operation has not been successful. In this instance, a logic 0 output is available at the connection 332 output of digital filter 338. That signal is inverted to logic 1 in an inverter 339A and supplied on connection 334 to activate gate 330A. Gate 330A then provides a logic 0 signal to the data input of a flip-flop 356, causing that flip-flop to be cleared on the next succeeding clock C1 pulse which is supplied to the trigger input. The resultant output from flip-flop 356 appearing on connection 358A enables gates 360, 362, 364, and 367. On the next succeeding clock pulse C2, gate 362 provides a logic 0 output at connection 350 to clear flip-flop 326 (an alternative to the output from gate 346).

Gate 360 includes an input at connection 366 for the purpose of detecting whether or not the prescribed maximum number of call-out attempts have been made. This logic 1 signal is obtained from the call originate counter 140 (FIG. 5A). For clarity, only the terminal ends of connection 366 are illustrated. If this condition exists, gate 360 provides a logic 0 output at connection 368 to the clear input of communications flag flip-flop 122 (FIG. 5A) to indicate that communications are no longer being undertaken and to thereby release the interlock so that other alarm call-outs will be honored. For clarity, only the terminal ends of connection 368 are illustrated.

The gate 364 is activated at the next C3 clock pulse interval after clearing of flip-flop 356 to issue a logic 0 pulse which is referred to as a terminate call pulse. This pulse is supplied on connection 365 to the trigger input of a flip-flop 370 (FIG. 5B) to initiate call termination actions which will be described more fully below.

Gate 367 is connected to receive, through an inverter 372, the logical inversion signal of the maximum count signal supplied on connection 366 from the call originate counter 140A. Thus, when the signal from inverter 372 is a logic 1, it means that the designated count has not yet been reached, and an additional attempt should be made to call out. Under these conditions, gate 367 is operable to supply a logic 0 output on connection 374 to the trigger input of a flip-flop 376 (FIG. 5B) to set that flip-flop and store the information that another call attempt is to be made. However, the new attempt to call out is appropriately delayed by the terminate call procedure so that the telephone exchange switches can drop out and the be re-engaged for the new call-out attempt.

For the above-mentioned purpose, the terminate call pulse storage flip-flop 370 (FIG. 5B), previously mentioned above, is operable when it is set by gate 364, to enable the NAND gates 378, 379, 380, and 382.

On the next succeeding C7 clock pulse, gates 379 and 380 are enabled. Gate 380 provides a signal on connection 160 to clear the data terminal ready flip-flop (FIG. 5A), and to thereby shut down the answer modem 62, since the answer modem should not be on the under call-terminated conditions. Gate 379 provides a signal on connection 352A to clear the off-hook flip-flop 168 (FIG. 5A). On the next succeeding C9 clock pulse, gate 382 provides a logic 0 output connected to clear the flip-flop 370.

However, on the next preceding C5 clock pulse interval, gate 378 is operated. Gate 378 is then effective to emit a signal to initiate the operation of a digital counter 386 which is referred to as a terminate call timer. This is a timer which assures a minimum time interval between attempts to call out. When the time interval is completed, the timer issues a logic 0 signal to the data input terminal of a flip-flop 390, to cause that flip-flop to be cleared when the next succeeding C6 clock pulse is received by the trigger input of that flip-flop.

The clearing of flip-flop 390 enables gates 392, 394 and 395. Gate 392 is then operable at the next C7 clock pulse to provide a signal on connection 312 to set the data terminal ready flip-flop 162 (FIG. 5A) to thereby enable the modem 62 so that it can later be turned on whenever there is a successful attempt to establish communications. For clarity, only the terminal ends of connection 312 are illustrated. On the next succeeding C8 clock pulse, gate 395 is operable through a connection 397 to clear the output flip-flop which is built into timer 386. On the same C8 clock pluse, gate 394 is operable to emit a signal on a connection 396 to the trigger input of a flip-flop 398. Flip-flop 398 is connected to receive an input at its data terminal from the set output of the flip-flop 376 indicating the condition that additional call-out attempts are to be made. Accordingly, when these two signals are both available, flip-flop 398 is set, providing an enabling output at connection 400 to the gates 402, 404A, and 406. Gates 402 and 406 are respectively operable on the next succeeding C9 and C10 clock pulses to clear the flip-flops 376 and 398. Gate 404 is operable on the next C9 clock pulse to emit a logic 0 signal on connection 142A to again trigger flip-flop 144A (FIG. 5A) previously described above, to again initiate the entire call-out procedure. As previously described, the gate 148, which is enabled by flip-flop 144A, advances the originate counter. In this maner, the circuit continues to attempt to call out under alarm conditions until the call is completed successfully, or until the prescribed maximum number of attempts have been made.

The circuit diagrams presented with this patent specification are specific in some respects, and schematic in some respects. In some instances, the circuits have been simplified in order to more clearly present the principles of operation. However, it will be understood that additional bistable circuits, gates, interlocks, and resets may be required, in accordance with usual conservative engineering circuit design principles, in order to avoid back circuits and timing sequence difficulties and to promote reliable operation. Also, the circuit diagrams are sometimes illustrated with simplified one line circuits in portions which actually require a pair of lines.

While the systems of the present invention are described as including two satellite stations, it is obvious that the principles of the invention may be applied to systems having one, or three or more satellite stations. Furthermore, it is obvious that many of the features of the invention are useful in systems which have no satellite stations.

While this invention has been shown and described in connection with particular preferred embodiments, various alternations and modifications will occur to those skilled in the art. Accordingly, the following claims are intended to define the valid scope of this invention over the prior art, and to cover all changes and modifications falling within the true spirit and valid scope of this invention.

We claim:

1. An operating condition data communication system comprising
a central station,
a passive station dedicated to the control and acquisition of data of an electronic apparatus,
said central station including means for establishing a connection to said passive station over a non-dedicated voice band-width communication link for transmitting commands to said passive station and for receiving responses from said passive station over said connection,
said passive station including processing means operable whenever a connection is established with said central station to issue a ready signal to the central station inviting the central station to issue a command to said passive station,
said processing means being operable for receiving and executing said commands from said central station and for transmitting responses to said commands to said central station,
said passive station including a first alarm condition call-out means operable in response to the detection of an alarm condition at said passive station to initiate a call-out operation for establishing communication over a non-dedicated voice band-width communication link to said central station,
the capability of said passive station to establish communication with said central station being limited to the establishment of the connection and the transmission of a ready signal to the central station inviting the central station to issue a command to the passive station.

2. A system as claim in claim 1 wherein
said central station includes an originate modulator-demodulator unit operable for transmitting commands in the form of digital keying modulations of a first pair of tones and operable for receiving responses from said passive station in the form of digital keying modulation of a second pair of tones,
said passive station including an answer modulator-demodulator unit for receiving digital signal commands from said central station on said first pair of tones and operable for transmitting passive station responses in the form of digital keying modulations on said second pair of tones,
the communications between said central station and said passive station always being carried out through said originate modulator-demodulator at said central station and said answer modulator-demodulator at said passive station for both communication connections initiated at said central station and for communication connections at said passive station in response to detection of alarm conditions.

3. A system as claimed in claim 2 wherein
said passive station means for initiating a call-out operation in response to the detection of an alarm condition includes a wait-to-answer timer for timing an interval beginning with the call-out operation,
said wait-to-answer timer being operable to emit a wait-to-answer signal pulse at the end of a predetermined interval after the initiation of the timer operation,
means operable in response to said wait-to-answer signal to test for the presence of said first pair of tones from said originate modulator-demodulator by detecting the presence of at least one tone of said pair indicating the completion of a connection to said central station,
said testing means being operable in the presence of said first pair of modem tones for terminating the call-out process,
said last-named means being operable in the absence of said pair of first modem tones to initiate a repetition of the call-out operation.

4. A system as claimed in claim 3 wherein
there is provided a counter connected to count the number of call-out operations initiated in response to an alarm condition,
and means connected to detect the occurrence of a predetermined maximum count of said counter and operable in response thereto for discontinuing further initiations of call-out operations.

5. An operating condition communication system comprising
a central station,
a passive station dedicated to the control and acquisition of data of a first electronic apparatus,
said central station including means for establishing a connection to said passive station over a non-dedicated voice band-width communication link,
said passive station being operable to receive a limited set of commands from said central station,
said passive station including processing means operable to execute said limited set of commands and to respond with a transfer of information to said central station including confirmation signals and any data requested by said commands,
said passive station being operable to issue a ready signal to said central station whenever said processing means is cleared and said passive station is ready to receive a command,
said passive station including a first timing means,
said passive station including means to detect a transfer of information between said passive station and said central station and operable to reset said first timing means in response to detection of said transfer of information,
said first timing means being operable in the absence of a reset for a predetermined time interval to clear said processing means and to cause said passive station to issue a ready signal to said central station.

6. A system as claimed in claim 5 wherein
said means to detect a transfer of information between said passive station and said central station is operable to reset said first timing means only in response to transfer of information from said passive station to said central station.

7. A system as claimed in claim 5 wherein
there is provided at least one satellite station connected through a dedicated voice band-width communication link to said passive station,
said satellite station being dedicated to the control and acquisition of data of a second electronic apparatus,
said passive station including transfer means operable in response to a command from said central station during communication between said central station and said passive station to transfer communication with said central station to said satellite through said passive station and said dedicated communication link.

8. A system as claimed in claim 7 wherein said satellite station is operable to receive a limited set of commands from said central station, said satellite station including processing means operable to excute said limited set of commands and to respond with a transfer of information to said central station including confirmation signals and any data requested by said commands, said satellite station being operable to issue a ready signal to said central station whenever said satellite station processing means is cleared and said satellite station is ready to receive a command, the ready signal issued by said satellite station being distinctive from the ready signals issued by said passive station, said passive station including a second timing means, said passive station including means operable to detect the transfer of information between said satellite station and said central station and operable to reset said second timing means in response to detection of said transfer of information, said second timing means being operable in the absence of a reset for a predetermined time interval to transfer communication with said central station from said satellite station back to said passive station and to thereby cause said passive station to issue a ready signal to said central station.

9. A system as claimed in claim 8 wherein said means to detect the transfer of information between said satellite station and said central station is operable to reset said second timing means only in response to transfer of information from said satellite station to said central station.

10. A system as claimed in claim 5 wherein said passive station includes a third timing means operable to commence a timing cycle upon the establishment of a connection between said passive station and said central station over a non-dedicated telephone line, said third timing means being operable after a predetermined interval of operation to switch said passive station into a disconnected mode of operation so that said passive station is ready for the initiation of a new establishment of a connection over a non-dedicated telephone line to thereby prevent communication failure, the operation of said third timing means being independent of the operation of said first timing means.

11. A system as claimed in claim 1 wherein there is provided at least one satellite station connected through a dedicated voice band width communication link to said passive station, said satellite station being dedicated to the control and acquisition of data of a second electronic apparatus, said passive station including transfer means operable in response to a command from said central station during communication between said central station and said passive station to transfer communication with said central station to said satellite station through said passive station and said dedicated communcation link.

12. A system as claimed in claim 11 wherein said satellite station includes means operable in response to the detection of an alarm condition of said second electronic apparatus to initiate a call-out operation for establishing communication over said dedicated communication link to said passive station, said passive station alarm condition call-out means being operable in response to the alarm condition call-out from said satellite station to initiate a call-out operation for establishing communication over said non-dedicated voice band width communication link to said central station.

13. A system as claimed in claim 1 wherein said passive station includes a status register for storage of information about each of the various alarm conditions resulting in call-out means operation, said passive station being operable in response to a command from the central station to transmit readings of the contents of said status register to said central station to provide information at the central station about the nature of the alarm condition.

* * * * *

UNITED STATES PATENT AND TRADEMARK OFFICE
CERTIFICATE OF CORRECTION

PATENT NO. : 4,006,461
DATED : February 1, 1977
INVENTOR(S) : J. ROLAND COULTER and ARTHUR E. FUERHERM It is certified that error appears in the above-identified patent and that said Letters Patent are hereby corrected as shown below:

Column 3, line 46, after "signals" insert --issued--.
Column 4, line 50, "circuits" should read --circuit--.
Column 7, line 44, "passive" should read --satellite--.
Column 8, line 53, "eleswhere" should read --elsewhere--.
Column 9, line 54, "connection" should read --connections--.
Column 14, line 58, "or" should read --of--.
Column 19, line 2, "componenets" should read --components--.
Column 21, line 66, "separatley" should read --separately--.
Column 22, line 1, before "digit" insert --dialing--;
          line 52, "spruious" should read --spurious--.
Column 23, line 63, cancel "the" before "under".
Column 24, line 22, "pluse" should read --pulse--.
Column 25, line 36, "claim" should read --claimed--;
          line 42, "modulation" should read --modulations--;
          line 55, after "connections" insert --initiated--.
Column 27, line 1, before "through" insert --station--;
          line 7, "excute" should read --execute--.

Signed and Sealed this

Twenty-fourth Day of May 1977

[SEAL]

Attest:

RUTH C. MASON
Attesting Officer

C. MARSHALL DANN
Commissioner of Patents and Trademarks